United States Patent
Giese

(10) Patent No.: US 6,621,895 B1
(45) Date of Patent: Sep. 16, 2003

(54) ENHANCED COMMUNICATION SERVICES FOR DATA NETWORKS

(75) Inventor: Peter A. Giese, Kinburn (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/386,462

(22) Filed: Aug. 31, 1999

(51) Int. Cl.[7] .................. H04M 1/24; H04M 3/22; H04M 3/42; H04M 1/68; H04J 3/16
(52) U.S. Cl. .............. 379/201.03; 379/10.03; 370/469; 370/465; 370/535; 455/410
(58) Field of Search .............. 455/410; 370/535, 370/469, 465; 379/10.03

(56) References Cited

U.S. PATENT DOCUMENTS

| | | | |
|---|---|---|---|
| 5,592,530 A | * 1/1997 | Brockman et al. | 379/10.03 |
| 5,717,747 A | 2/1998 | Boyle, III et al. | 379/201 |
| 5,790,789 A | 8/1998 | Suarez | 395/200.32 |
| 5,790,809 A | 8/1998 | Holmes | 395/200.58 |
| 5,898,765 A | 4/1999 | Teglovic et al. | 379/120 |
| 6,014,557 A | * 1/2000 | Morton et al. | 455/410 |
| 6,396,853 B1 | * 5/2002 | Humphrey et al. | 370/535 |

* cited by examiner

*Primary Examiner*—Ahmad F. Matar
*Assistant Examiner*—Thjuan P Knowlin
(74) *Attorney, Agent, or Firm*—Kent Daniels; Ogilvy Renault

(57) ABSTRACT

An Enhanced Communication Services layer is adapted for connection intermediate a content application layer and a transport services layer of a communication network. The content application layer is adapted to generate payload data of a service instance. The transport services layer includes a physical fabric of the communication network and is adapted for end-to-end transport of the payload data across the communication network. The Enhanced Communication Services layer comprises a Contact Agent, an Exchange Agent and a Transport Agent, The Contact Agent is adapted to discover information identifying parties involved in a service instance. The Exchange Agent is responsive to the Contact Agent, and adapted to select, from a network space comprising one or more transport services, a best match set of transport services for the service instance. Finally, the Transport Agent is responsive to the Exchange Agent for engaging the selected set of transport services for the duration of the service instance.

52 Claims, 20 Drawing Sheets

Figure 6

| Transformation Services | Service Management | Directory Services | Session Control | Brokerage Services |
|---|---|---|---|---|
| • Content Adaptation<br>• Transcoder<br>• Format Conversions | • Recognition<br>• Device<br>• Subscribers<br>• Application<br><br>• Contract Administration<br><br>• Service Assignment<br><br>• Offer Assembly<br><br>• Special Services | • Address Conversion<br>• DN Mapping<br>• DNS<br><br>• Location Management<br>• Device<br>• Subscribers<br>• Applications | • Connectivity Models<br>• Flow/Circuit<br>• Best Effort<br><br>• Connectivity Life Cycle<br><br>• Service Control<br>• Application Binding<br>• Connectivity Binding | • Connectivity Broker<br>• QoS Selection<br>• CoS Selection<br><br>• External Brokerage<br>• Access<br>• Foreign |
| 28 | 30 | 32 | 34 | 36 |

EXCHANGE AGENT — 12

Figure 8

| Transformation Services | Service Management | Directory Services | Session Control | Brokerage Services |
|---|---|---|---|---|
| • Control Adaption<br>• Proxy Clients<br>• Entry Messages<br>• Exit Messages | • Account Management<br>• Configuration Management<br>• Contact Polices | • Route Determination<br>• Interoperability<br>  • Equipment<br>  • Services | • Session Activation Triggers<br>• Blocking & non-Blocking | • QoS Matching<br>• CoS Matching<br>• Contracts |
| 38 | 40 | 42 | 44 | 46 |

TRANSPORT AGENT 14

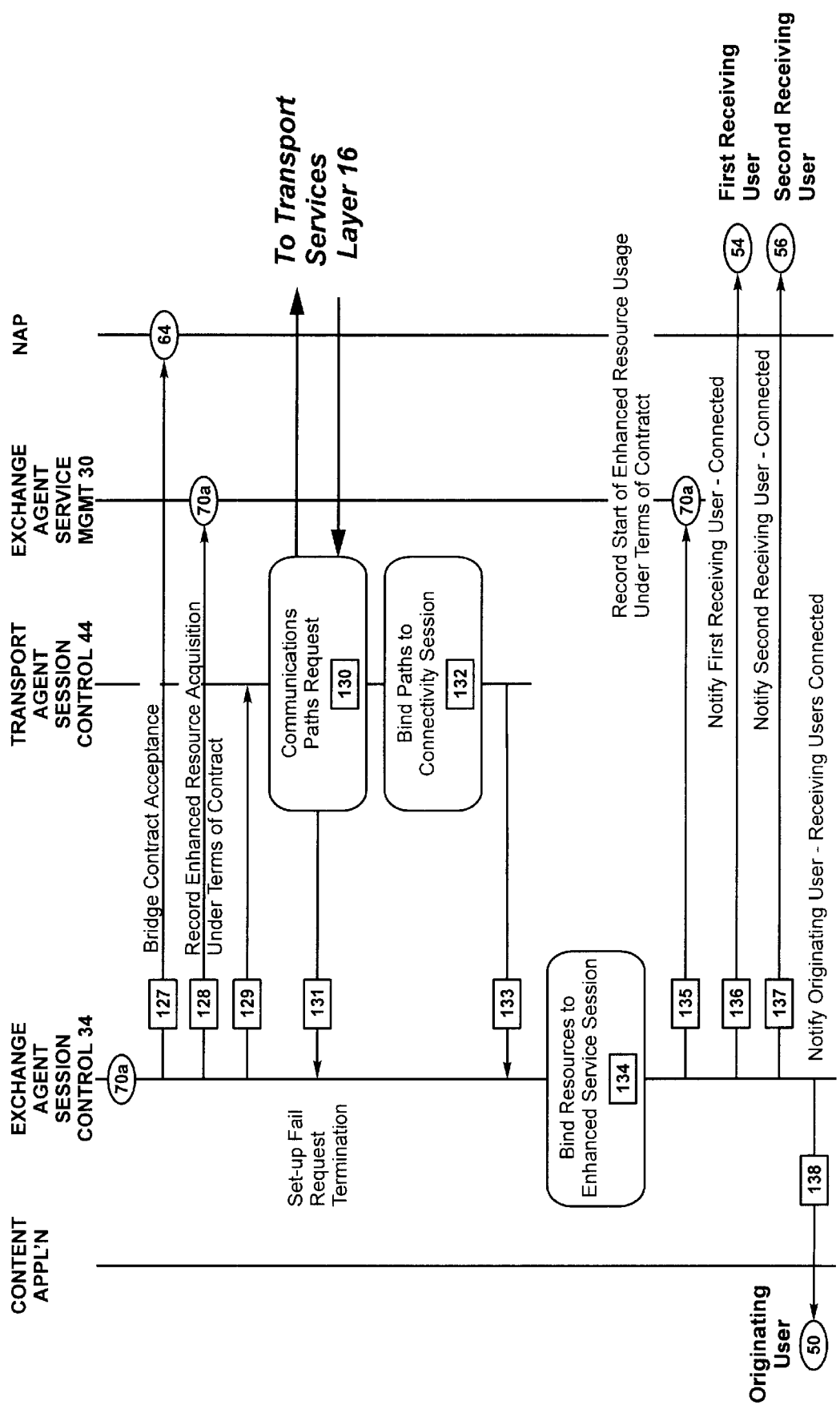

Figure 15

| Net | Term | Source | Dest. | Type | Adaptations | | Bridge | | Conditioning (conversions) | |
|---|---|---|---|---|---|---|---|---|---|---|
| | | | | | ESC Layer | Transport Layer | ESC Layer | Transport Layer | ESC Layer | Transport Layer |
| IP Site | (54) | (54) (54) (64) | (54) (54) (64) | FdxVideo FdxAudio FdxAudio | (64) - G.723-G.711 - | - - - | (58) - - - | - - - | (66) - - - | IP-AAL IP-AAL IP-AAL |
| ATM Coll | (50) | (50) (50) (64) | (66) (64) (66) | FdxVideo FdxAudio FdxAudio | - G.723-G.711 - | - - - | - - - | - - - | - - - | IP-AAL IP-AAL IP-AAL |
| | (54) | (66) (66) | (58) (56) | FdxVideo FdxAudio | - - | - - | H.263-H.261 - | - - | - - | - - |
| | (50) | (66) (66) | (58) (58) | FdxVideo FdxAudio | - - | - - | H.263-H.261 - | - - | - - | - - |
| TDM Site | (56) | (66) | (58) | FdxAudio | (60) Proxy Client | - | - | - | - | - |
| | (56) | (56) | (66) | FdxAudio | - | - | - | - | (66) - | TDM-ALL |

Assumes CCS7 Throughout (70a) (70b) (70c) (Note 1.)

Note : 1. A network signaling protocol change between networks in Enhanced &/or Primary layers would normally require conditioning at intervening Gateways. However, for the purposes of this walk-through CCS7 has been assumed for both layers throughout so no Signaling Conditioning is required.

ENHANCED COMMUNICATION SERVICES FOR DATA NETWORKS

CROSS REFERENCE TO OTHER APPLICATIONS

This is the first application filed in respect of the present invention.

MICRO-FICHE APPENDIX

Not applicable.

TECHNICAL FIELD

The present invention relates to communication networks and, in particular, to Enhanced Communication Services (ECS) operative within a communication network and designed to meet the requirements of modern users and to an ECS enabled network incorporating such enhanced communication services.

BACKGROUND OF THE INVENTION

Communication networks have historically been constructed using models and protocols as guides. Networking models and protocols have proliferated over the past few years as new networks have been introduced or existing networks have evolved to accommodate new end-user, device and application requirements. The proliferation of networking models has been manifested in monolithic, highly integrated network and network component architectures. Functionality and products developed for a target group of end-users, devices or applications are almost invariably not readily extendible to another network without extensive modification or complete re-creation. New networks cannot capitalize on functionality and protocols developed for previous networks because monolithic integrated designs do not permit porting. Current networks provide limited choice of services and the choices available are often difficult to access. Adding new functionality to installed networks requires complex modifications of the previously existing functionality. The time required to implement these modifications is incompatible with the modern competitive communication business environment where the speed to market greatly influences total revenues earned. As a result, the present network space consists of a collection of heterogenous modern and legacy networks, each operating under respective different models and protocols (e.g. TDMA, frame relay, ATM, TCP/IP etc.); utilising different transport media (e.g. copper, fibre, satellite etc.), and frequently owned by different business entities. Federated networks are edge-connected by means of gateway servers, permitting transport of communication data between the networks. However, where federated networks are dissimilar, adaptation services are required to facilitate the transport of data across the networks. Thus a modern user of communication services must be conscious of the network technology to which they have access, and must assess its suitability for any desired communication session. Additionally, the user must consciously interact with the network, in a manner dictated by the network model, in order to achieve their communication goals.

In the context of the present invention, adjoining communication networks are considered to be "dissimilar" or "heterogeneous" if their respective models, protocols and/or transport media are sufficiently different that communication data originating in one network cannot be transported by an adjoining network without conversion of the data. Such conversion of data, referred to herein as "adaptation", is an automated process (which may or may not be user selected) to facilitate transport of data across the heterogeneous networks. For example, a site network operating under the TCP/IP protocol may be edge-connected with a collector network operating under the ATM protocol. Data originating in the site network must be adapted (e.g. in a gateway server intermediate the two networks) to conform to the ATM protocol before it can be transported by the collector network.

Modern voice communication networks have evolved in the twentieth century with a focus on creating universal telephone services. Currently, a revolution in telecommunications is underway that holds the promise of providing ubiquitous service for multimedia applications. The development and evolution of these multimedia applications are largely driven by market forces (the demands of end users) and offered by vendors who are usually unrelated to the owners of the transport media used for the multimedia communication sessions. Multimedia communication sessions are typically mediated by edge service providers (e.g. Internet Service Providers—ISP's), who are frequently unaffiliated with owners of network transport media, and who may offer complex edge services to augment the power of content applications being used by their customers.

In order to achieve a goal of ubiquitous multimedia communication, modern networks are in need of an enabling interoperability infrastructure, just as in the past computers were in the need of a data network. It is widely recognized that networking solutions need to take into account increasingly powerful edge services and content applications that are currently available or are under development.

Others have addressed this need by contributing to the design of network architectures aimed at providing ubiquitous access to multimedia services. For example, the Telecommunications Information Networking Architecture Consortium (TINA-C) have produced a document entitled *Service Architecture Version*: 5.0 dated Jun. 16, 1997. The TINA-C architecture stems from a guiding principle arising from market, industry and sociological trend analysis. The key trends analyzed in devising the architecture include: layering the network architecture to move application and service logic out of transport nodes and specific telecommunications technologies to higher level entities; providing telecommunications in a multi-player, multi-provider environment; and, user choice of telecommunication services. The TINA-C architecture is a three macro-layer view of the network that assumes a middleware distributed processing domain, and utilises Open Distributed Processing (ODP) similar to that defined by the Object Management Group (OMG). The TINA-C architecture advocates technology independent views of transport elements and connections by representing both abstractly. It also includes the concept of a services broker used to match communication services in the middle layer and transport layers with user specifications. Communication can be effected across federated, heterogeneous networks and adaptation occurs at network edges as a part of a Resource Partition Layer.

Another network architecture has been proposed by the MultiMedia Communications Forum, Inc. (MMCF) in a paper entitled *Reference Architecture Model Specifications* dated 1995. The purpose of the document is to provide a framework for the structure of the integrated services required by distributed multimedia applications. The focus is on the aspects of the architectural model that support multimedia communication applications such as multimedia conferencing and multimedia information service. The underlying technology is not of primary focus. The MMCF architectural framework consists of logical domains which offer a set of services and their respective functions. The partitioning addresses the complex problem of communicating between distributed application processes. Each domain is accessed by functions in other domains through an open interface referred to as an Application Program Interface (API). The open interface shields each domain from the specific characteristics of the functions and services provided by other domains. Thus, the specification of domains may evolve with changing technology without directly impacting other domain specifications. Within this model resides a manager entity, associated with the application, middleware, media device and transport domains to manage information flow sent/received from the network and delivered to the end-user.

The MMCF reference architecture model consists of a user presentation layer, an application domain layer, a middleware domain layer, and a lower layer which is divided into a media device domain sector and a transport domain sector. APIs are provided between each of the four layers to enable inter-layer communication. Communications are handled in a trickle-down, trickle-up format in which direct communication appears to be enabled only between adjacent layers. User applications must therefore traverse each intervening layer in order to initiate a communication session regardless of the simplicity of the user's requirement. This leads to complication in network infrastructure, contributes to costs and decreases efficiency.

There therefore exists a need for ECS that provide access to network transport services from a network edge or from content applications in order to ensure the flexibility required to satisfy the communication requirements of a diverse community of users, and to permit efficient interworking of federated networks. There also exists a need for ECS in a multilayer network in which each of the layers and layer components may be utilized as self-contained logical entities and may be owned by separate business entities.

SUMMARY OF THE INVENTION

It is an object of the invention to provide Enhanced Communication Services (ECS) operative within a layered network in which the functionality of logical components is clearly separated.

It is a further object of the invention to provide ECS in which logical agents respectively provide contact, exchange, and transport services for a multimedia session.

Accordingly, an aspect of the present invention provides an Enhanced Communication Services layer adapted for connection intermediate a content application layer and a transport services layer of a communication network, the content application layer being adapted to generate payload data of a service instance, and the transport services layer comprising a physical fabric of the communication network and being adapted for end-to-end transport of the payload data across the communication network, the Enhanced Communication Services layer comprising: a Contact Agent adapted to discover information identifying parties involved in a service instance; an Exchange Agent responsive to the Contact Agent and adapted to select, from a network space comprising one or more transport services, a best match set of transport services for the service instance; and a Transport Agent responsive to the Exchange Agent for engaging the selected set of transport services for a duration of the service instance.

A further aspect of the invention provides a method of providing Enhanced Communication Services in a communication network, the method comprising the steps of: discovering information identifying the parties involved in a service instance; selecting, from a network space comprising one or more transport services, a best match set of transport services for the service instance; and engaging the selected set of transport services for the duration of the service instance.

A further aspect of the present invention provides a communication network adapted for providing flexible communication services between end users, the network comprising: a Content Application Layer adapted for generating payload data of a service instance; a Transport Services Layer adapted for end-to-end transport of the payload data; and an Enhanced Communication Services layer intermediate the content application layer and the transport services layer, the Enhanced Communication Services layer comprising: a Contact Agent responsive to the Content Application Layer and adapted to discover information identifying parties involved in the service instance; an Exchange Agent responsive to the Contact Agent and adapted to select, from a network space comprising one or more transport services, a best match set of transport services for the service instance; and a Transport Agent responsive to the Exchange Agent for engaging the selected set of transport services for a duration of the service instance.

A still further aspect of the present invention provides a Contact Agent operable in a communication network having a content application layer adapted to generate payload data of a service instance, the Contact Agent being responsive to the Content Application Layer and comprising: a profile construction portion adapted to construct a respective party profile for each party involved in the service instance; and an API generating portion adapted to generate one or more communication primitives defining, in respect of the service instance, any one or more of: each party profile constructed by the profile construction portion; and a communication service required for the service instance session.

A still further aspect of the present invention provides an Exchange Agent operable in a communication network having a content application layer adapted to generate payload data of a service instance, and a transport services layer comprising a physical fabric of the communication network and being adapted for end-to-end transport of the payload data across the communication network, the Exchange Agent being adapted to select, from a network space comprising one or more transport services, a best match set of transport services for the service instance, and comprising: a service management portion adapted to select a respective best match end-point device for each party involved in the service instance; a directory services portion adapted to resolve a physical address on the network corresponding to each selected end-point device; and a session control portion adapted to select, from the network space, a best match set of transport services for end-to-end connectivity between the selected end-point devices.

A still further aspect of the present invention provides a Transport Agent operable in a communication network having a content application layer adapted to generate payload data of a service instance, and a transport services layer comprising a physical fabric of the communication network and being adapted for end-to-end transport of the payload data across the communication network, the Transport Agent being adapted to engage, from the transport services layer, a best match set of transport media to accomplish end-to-end transport of the payload data of the service instance, and comprising: a directory services portion adapted to determine a best-match route for end-to end connectivity across the communication network; and a session control portion adapted to engage, in the transport services layer, transport services layer devices corresponding to the best-match route.

In accordance with an embodiment of the present invention, the ECS architecture can enable multimedia communication across a diverse network space of content applications and network provider alternatives. Multimedia is a ubiquitous element in the way people work, play, and conduct business; and places high demands on network infrastructures to deliver quality-of-service guarantees. In the context of this invention, the definition of "multimedia" entails the technical aspects of using one or more media types (text, images, graphics, speech, audio, video, and data files) for the purpose of communicating across transmission, storage, access and content creation applications. Thus defined, the term "multimedia" also includes conventional communications involving a single media type, such as, for example, e-mail (text) and voice (plain old telephone—POTS) communication.

In the context of the present invention, the term "logical agent" (or simply "agent") refers to a software component which performs a task on behalf of a party (e.g. a user, machine, content application, or another agent) rather than have the party perform the task itself. This reflects traditional dictionary meanings, for example one who acts for another, and does not specifically refer to mobile autonomous software. Various agents can be employed within the ECS architecture to achieve dynamic instantiation of appropriate communication components for each service instance. The role of agents is to enable parties to communicate easily and effectively across diverse network domains. In combination, the agents serve to combine infrastructure capabilities into a service instance that meets the goals defined by the parties. The term agent also serves to emphasize that the "delegation" of tasks insulates each layer from the technical details of the layers that lie beneath it. The emphasis is on the ability of network-based middleware services to independently interoperate with other software services. Each agent can be comprised of one or more functionally-related logical units which co-operate to provide the functionality of the agent in question. This enables the adoption of technologies as they mature for use in the communication industry, such as distributed component software, intelligent agents, brokerage and knowledge databases.

In an embodiment of the invention, each of the agents are accessed by means of primitives enabling users, edge services and content applications to access network transport services while being shielded from the underlying technology of both the logical agents and the network transport services. This facilitates a clear separation of logical functionality of network components. End-user communication appliances and content applications (including GUI functionality) can be built without reference to any specific network model, protocol or transport medium. Similarly, transport devices (e.g. switches, routers etc.) can be provided with minimum (i.e. only path dependent) installed software which can be accessed and controlled through the use of device-specific primitives. Network functionality including party (address) identification, selection and engagement of network services (including contracts, brokerage, proxies, negotiation, and, where necessary, adaptation services) and communication session control, management and administration, as well as end-to end connectivity control functions, can be accessed and controlled by the ECS of the present invention.

Advantageously, functionality within the ECS can be further subdivided into logical components, which can be accessed and controlled (and which interact with each other) by means of primitives. The set of primitives used by the ECS form a universal interface language permitting end users, content applications and edge services to engage network functionality without being conscious of the underlying technology. Thus ECS logical (and other network) components can be developed and evolve independently, and be supported by independent business entities, thereby facilitating a rich and constantly evolving network space. End users interact with each other, not the network.

Enhanced Communication Services of the present invention do not require a single system architecture for all networks, just as the Internet does not require a single system architecture for all the computers that are connected to it. As a network-based middleware, ECS is designed to fit between content applications and transport providers. The associated benefits of this approach are that it:

Insulates users from the complexities of establishing communications;

Adapts the network to user's capabilities, rather than forcing the user to adapt to the network's offerings;

Allows network and service providers to utilize multiple technologies to meet user requirements in the most cost-effective fashion;

Shields applications from the impact of technology changes by separation of content applications from transport;

Creates a path towards achieving an open network-based platform capable of supporting a diverse range of multimedia based content applications;

Enables greater collaboration across services by utilising a "self-service" approach to networking (e.g. agent collaboration);

"future proofs" the overall of design of network services by providing a requirement-driven interface between applications and networks;

Creates a universal framework for multivendor interoperability;

Provides a vehicle for network vendors to deliver value added features (i.e. security, flexible billing, and virtual networking policies);

Avoids the inherent difficulty of supporting a large number of vertically integrated products; and Simplifies the design and support of network equipment.

Enhanced Communication Services provide network-based middleware services that intelligently bridge the gap between smart edge and smart networks. In addition, the invention addresses the key challenge of providing diversity of network services while maintaining simplicity of use.

Building communication solutions based on a modular functional approach has the advantage of allowing flexibility in how agents are packaged. It is expected that ECS will not be implemented as a complete system, rather will be realized through the evolution of several products. These products will reflect the challenge of delivering party identification, device independence, next generation session management and multivendor interworking. With this in mind, each agent has been positioned to possess values needed to meet these challenges and can be deployed as stand-alone product offerings.

| Agent | Values |
|---|---|
| Contact | Decoupling device from communicating party. Recognition of parties based on personal or party IDs. Freedom to select alternative devices for communication. Profiles that allow customization of communication requirements. Eliminates the restriction that an address is a single device. Use of temporal and geographic information to define personalized communication treatments or behaviours.. |
| Exchange | Streamlines the selection of devices. Enables communication between devices and networks that can not normally interoperate (i.e. transformations and proxies). Primitives enable improved interoperability across transport technologies. Allows bridging of value added services using either edge or network based solutions. Automatically adapts to user differences and session changes. |
| Transport | Transport engagement process appears simple, familiar and straightforward. Customizes and optimizes movement of information behavior for end parties. Enables end-to-end interoperability across any networking technology or operator domain.. |

Content providers (e.g. access providers and/or vendors of content application software) will be able to build content solutions that can operate over any communication infrastructure. Enhanced Communication Services, according to an embodiment of the invention, will enable content providers to deploy multimedia based content applications with greater simplicity and ubiquity. Network providers will be able to build network solutions that consist of products from multiple vendors. Enhanced Communication Services according to an embodiment of the invention will enable network providers to build competitive solutions over heterogeneous computing and networking environments. ECS also offers an evolution path for both IP and TDM networks.

BRIEF DESCRIPTION OF THE DRAWINGS

The invention will now be explained by way of example only and with reference to the following drawings, wherein:

FIG. 6 is a table showing examples of the functional partitioning of the Exchange Agent;

FIG. 8 is a table showing examples of the functional partitioning of the Transport Agent;

FIGS. 14a–14f are call walk-through diagrams illustrating an exemplary call walk-through of a multimedia session using the ECS of the present invention; and FIG. 15 is a table showing connection samples for the call walk-through illustrated in FIGS. 14a–14f.

DETAILED DESCRIPTION OF THE PREFERRED EMBODIMENT

Figure 1:
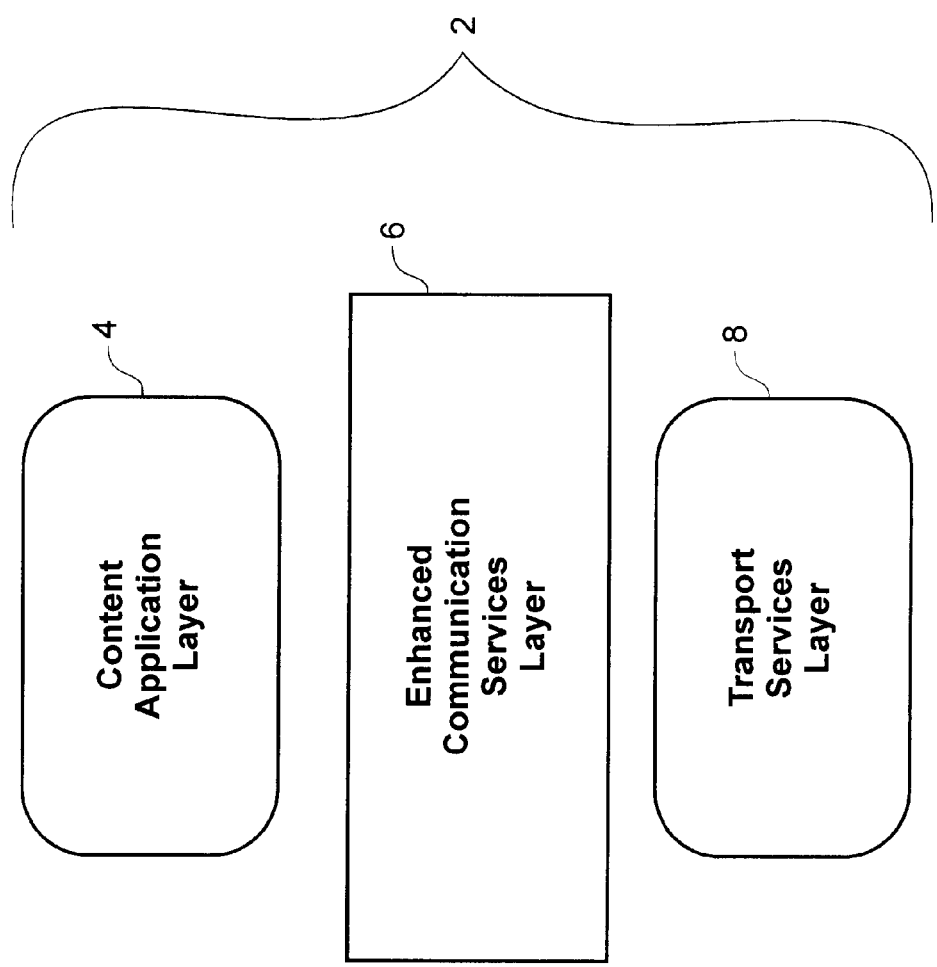
FIG. 1 is a schematic diagram of a communication network partitioned into layers for use with ECS in accordance with the present invention.

Referring to FIG. 1, the invention provides Enhanced Communication Services (ECS) in a network 2 based on a layered network model and the principle of maintaining a clear separation between the layers of functionality in the network. FIG. 1 illustrates the layers of functionality in such an ECS-enabled network 2. The functional layers consist of: edge-based application functionality referred to as the content application layer 4 that generates payload data to be moved by the network 2; a network-based ECS layer 6; and a transport services layer 8 consisting of the transport node devices and interconnecting links, such as fibre-optic links that carry payload data generated by the content application layer 4.

The content application layer 4 generally comprises communication appliances, appliance resources, application software and other content-generating services at the network edge. These may be owned by end users and/or network access providers for use by their customers.

The transport services layer 8 can be made up of heterogeneous federated networks incorporating both new and legacy transport technologies. Traditionally, high level path independent services have been bundled with network node equipment, and this is certainly the case with most, if not all legacy network transport systems. In an embodiment of the present invention, these path independent services are confined to the ECS layer 6, leaving only path/node specific services resident in the nodes.

Figure 2:
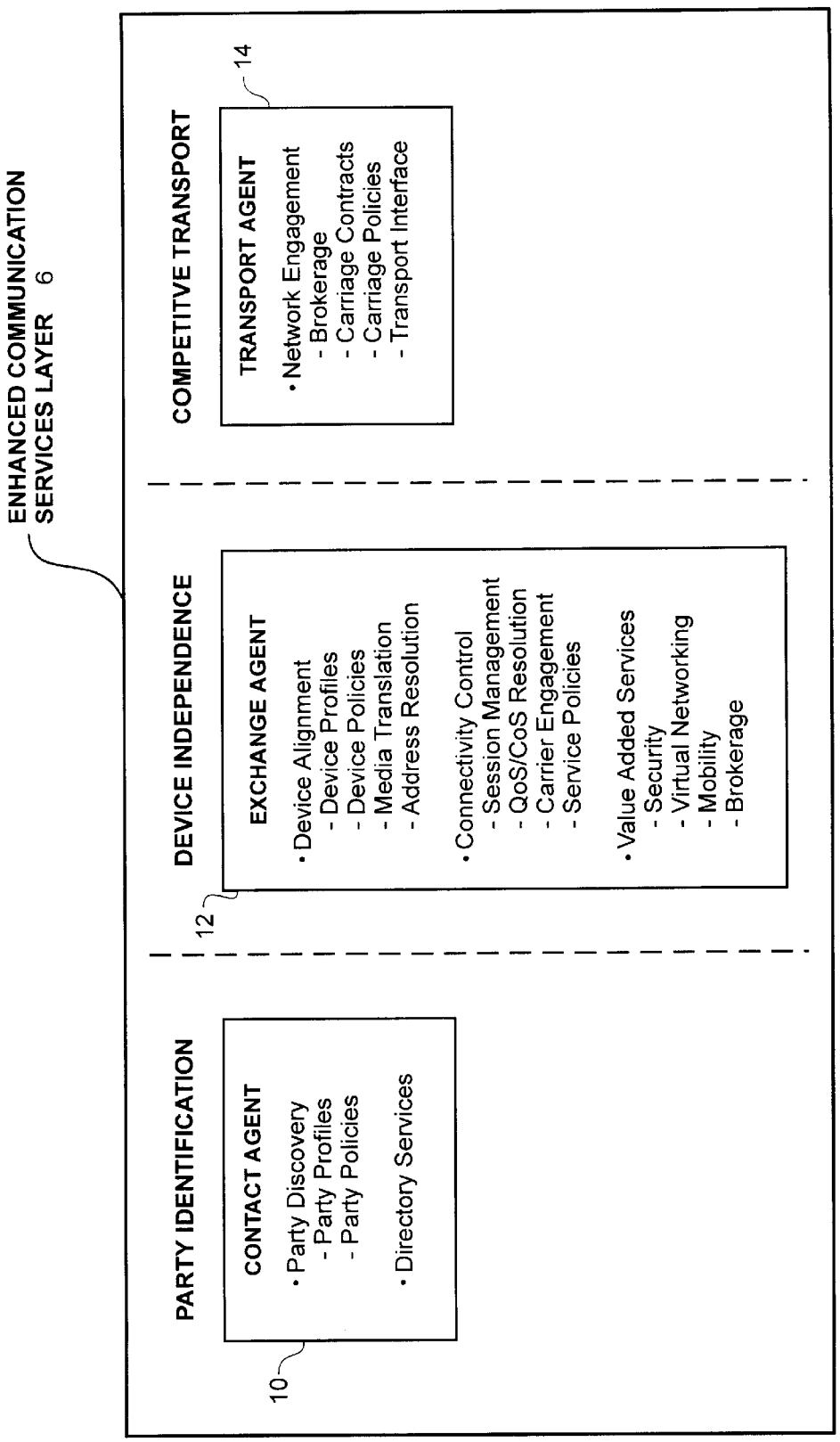
FIG. 2 is a schematic diagram showing how the ECS are further partitioned into Contact, Exchange and Transport Agents in accordance with an embodiment of the present invention.

The ECS layer 6 comprises a plurality of co-operative network-based middleware services which intelligently bridge a gap between content applications and network transport services. As illustrated in FIG. 2, the ECS layer 6 is subdivided into a Contact Agent 10, an Exchange Agent 12, and a Transport Agent 14.

The terms "edge-based" and "network-based" denote a natural point of functionality of the component/layer in question, rather than any geographical location at which components may be resident. The content application layer 4 is "edge-based" in the sense that it delivers functionality (e.g. GUI, multimedia applications, access provider services etc.) at the network edge. Functionality of the content application layer 4 will generally be provided by communication appliances and software applications and components which may be resident in any one or more of user-owned communication appliances, access provider servers, or network servers. Similarly, the ECS layer 6 is "network based" in the sense that it delivers functionality (e.g. contact discovery, session and connectivity control, brokerage etc.) across the network space. Functionality of the ECS layer 6 will generally be provided by software components which may be resident in any one or more of user-owned communication appliances, access provider servers, or network servers.

Figure 3:
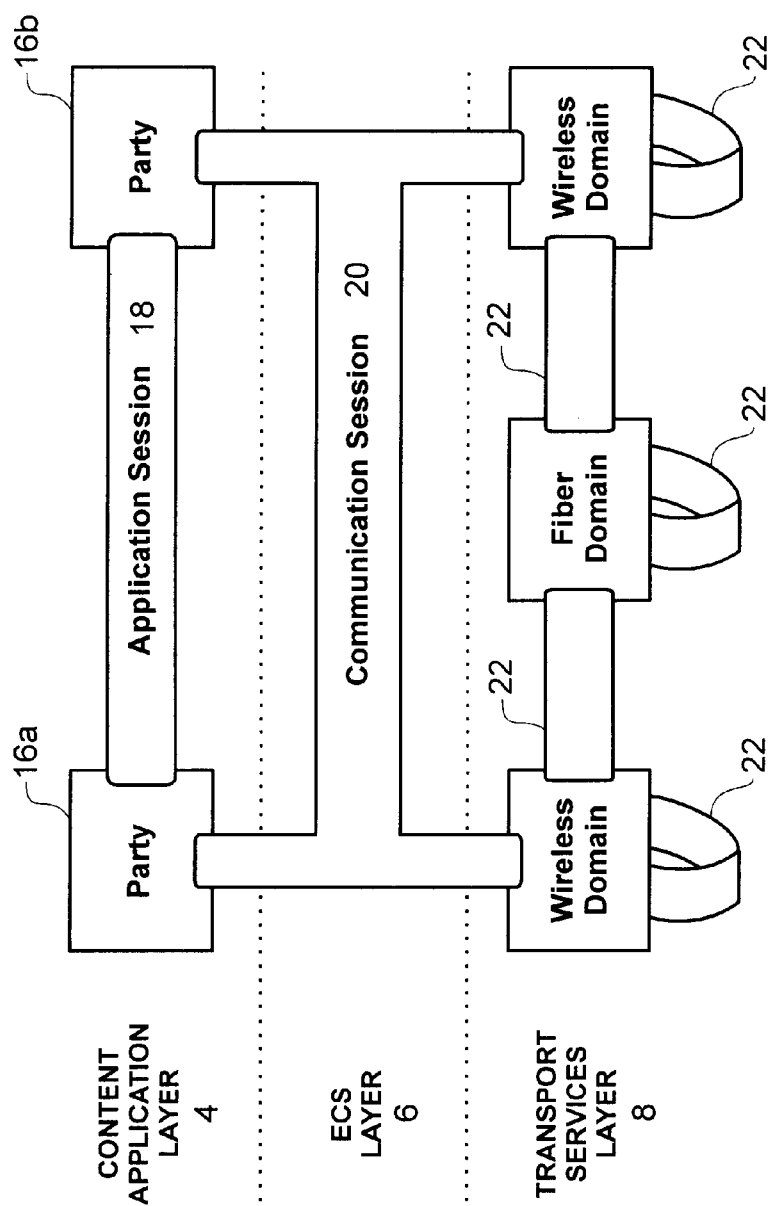
FIG. 3 a schematic illustration of sessions comprising a service instance in an ECS-enabled network.

Referring now to FIG. 3, partitioning network functionality into layers and agents, as described above, renders obsolete the notion of "calls" or "connections", in favour of "service instances" and "sessions". A "service instance" occurs when a party 16a,b (which may be, for example: an end user, content application software, a proxy client etc.) residing in the content application layer 4 requests and successfully engages one or more communication services. A service instance normally comprises one or more "sessions" which encompass various aspects of transport of payload data of the service instance. In an embodiment of the invention, three types of sessions are provided, namely: Application sessions 18; Communication sessions 20; and Transport sessions 22, each having respective different functionality and each residing in a respective layer of the network 2. A clear separation of these different types of sessions enables set-up and management of a service instance to be broken down into manageable elements. An application session 18 resides within the content application layer 4, and entails transmission of payload data between communicating parties 16, independent of underlying technology in the ECS and transport services layers 6, 8. A communication session 20 resides within the ECS layer. 6, and entails end-to-end management of infrastructure resources and connectivity controls for payload data steams of a respective application session 18. Finally, a transport session. 22 resides within the transport services layer 8, and manages the physical movement of the payload data. Thus establishment of a service instance will normally involve the set up of an Application session 18, a respective Communication session 20; and one or more transport sessions 22.

ECS of the present invention shields communicating parties 16a,b from underlying network technology of a service instance, thereby rendering the network 2 substantially transparent. Consequently, the Application session 18 is virtual, in the sense that payload data is not actually transported directly from party-to-party, but rather are transported via communication and transport sessions 20, 22. However, the communication and transport sessions 20, 22 are "hidden" from the end users, so that the characteristics of the application session 18 dominate the end-user's perception of the service instance. Typically, a service instance will involve a single communication session 20 across any/all federated network domains involved in the service instance. However, a separate transport session 22 will normally be instantiated within and between each domain involved in the service instance. Thus a typical service instance can be expected to involve a plurality of transport sessions 22.

Partitioning network functionality into layers and agents as described above reduces the development time and complexity associated with introducing new network service offerings. Network-provided services have been traditionally bundled into underlying transport technologies. Consequently, modifying or adding services required changes to many different technologies often required software and/or equipment modifications to each node in a legacy network. Porting services between legacy networks of different technologies was difficult, if not impossible. The present invention repartitions network functionality, both in terms of horizontal layer separation and in terms of edge and network concentrations to minimize the impact of ongoing evolution and change.

Partitioning network functionality into layers also permits functionality within individual layers to be evolved independently of other layers. The present invention also provides users, content applications or user agents with access to, and means of executing choice in selecting a diversity of service suppliers and network functionality that best meets their communication needs. The ECS layer 6 is designed to accommodate a larger number of service providers participating in federated communication networks which are expected to evolve in response to deregulation and increased competition. The ECS layer 6 also permits end-users or their agents to dynamically exploit the diversity in capabilities and pricing associated with different technologies employed by those service providers.

The ECS layer 6 also provides transparent interoperability between stationary, nomadic and mobile end-users, devices and applications within and across networks, as will also be explained below in more detail.

Successful partitioning allows independent businesses to evolve and operate around aspects of functionality. Thus, ownership must be considered when partitioning functionality. Partitioning network functions into layers and agents creates functional groups of logical components that can be separately owned, managed and operated.

A detailed discussion of the architecture and operational characteristics of each of the three agents is provided below with reference to FIGS. 4–8. This will be followed by a description of primitives used by the ECS with reference to FIGS. 9 and 10, and a description of exemplary agent collaboration modes with reference to FIGS. 11 an 12. Finally, an exemplary walk-through of a multimedia service instance utilising an ECS-enabled network will be provided with reference to FIGS. 13 to 15.

Figure 4:
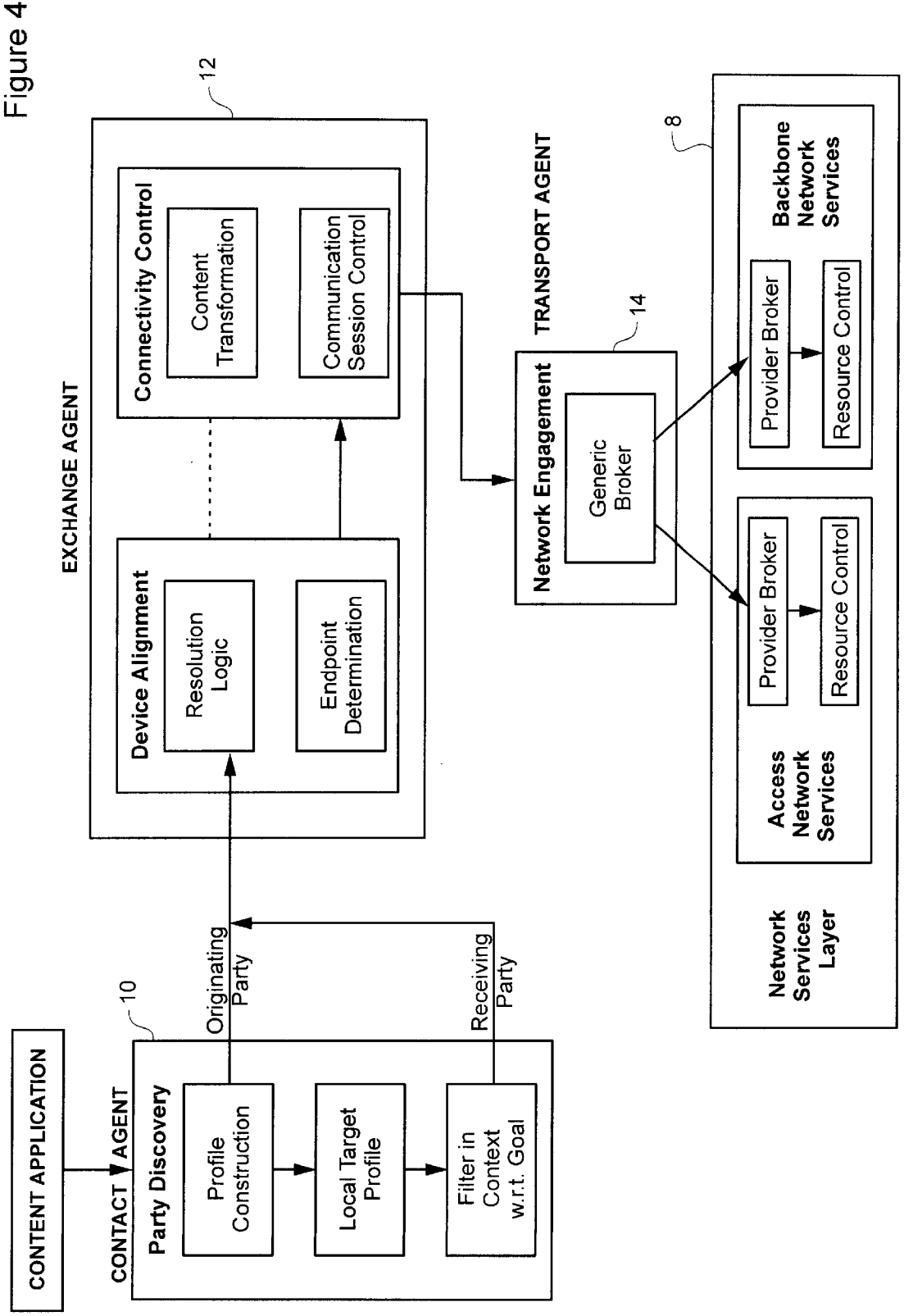
FIG. 4 a schematic illustration of exemplary operations performed by each of the three agents, and the flow of data during set-up of a service instance.
Figure 5:
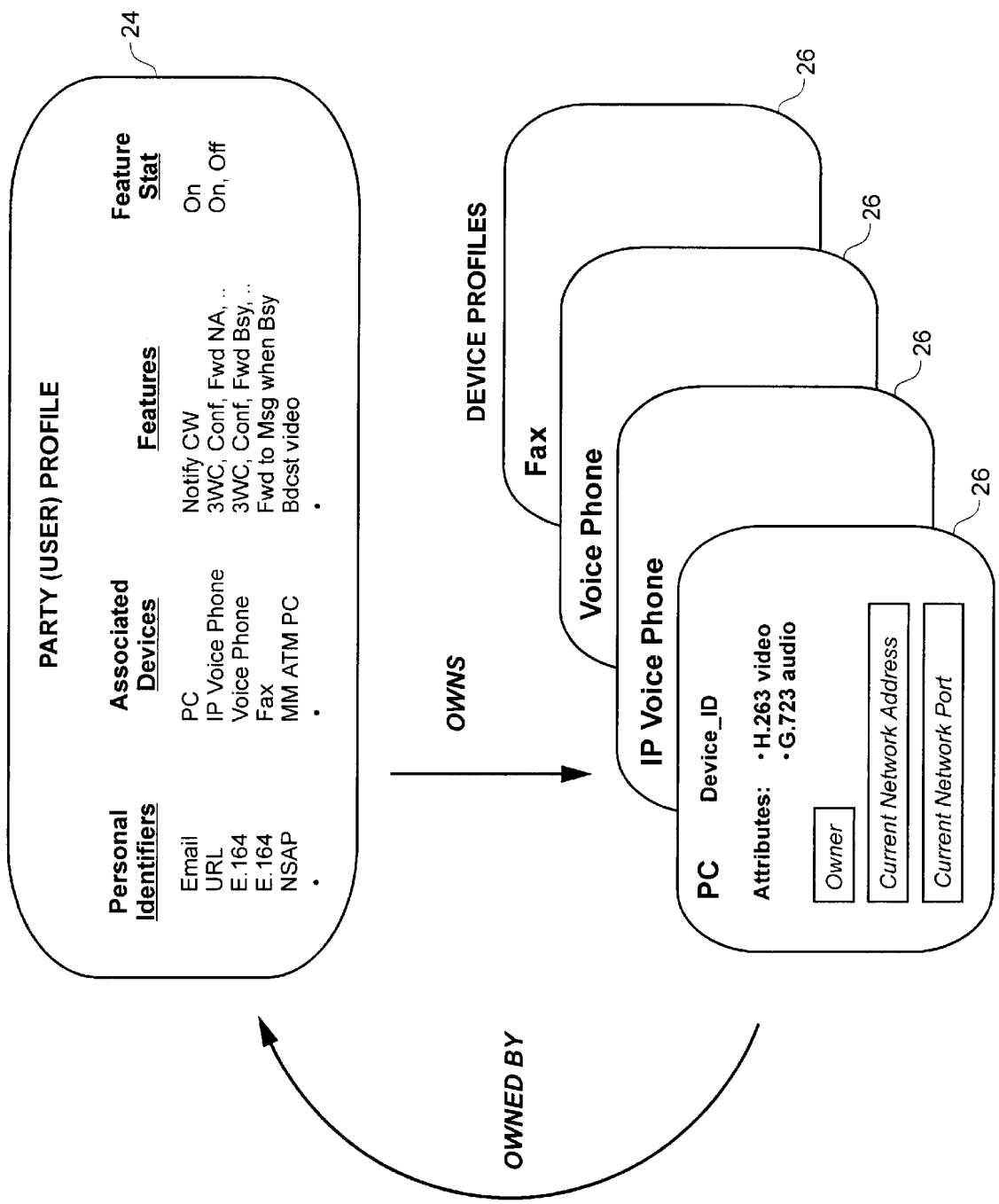
FIG. 5 is a schematic diagram illustrating an example of user profiles and device profiles used by the ECS of the present invention.

FIG. 4 is a schematic diagram of exemplary operations (roles) performed by each of the three agents 10–14, and the operational thread during set-up of a service instance. It will be appreciated that the illustration in FIG. 4 is not intended to be exhaustive, or to identify specific logical components of any of the agents. Rather, FIG. 4 is intended to illustrate the operational partitioning within the ECS layer 6, and the general relationships between the three agents.

Contact Agent

In future networks, personal identifiers or addresses will likely be decoupled from devices and parties will specify their multimedia communication requirements. The operational role of the Contact Agent 10 is to handle all aspects of "party discovery", to elucidate party communication preferences and capabilities for each service instance. The Contact Agent 10 enables both Terminal and User Mobility through the use of party (or user) profiles 24 and device profiles 26, illustrated in FIG. 5. These profiles 24, 26 are S/W data Objects which identify Users and Devices, as well as describe their respective attributes and policies. Conveniently, the party and device profiles 24, 26 are stored in a host directory (e.g. DNS or SCP) resident in network server. The two sets of profiles 24, 26 are inter-linked. A user may own several communication devices. The associated device types and device numbers are listed in the party profile 24 and serve as pointers to respective device profiles 26. The device profiles 26, in turn, have an ownership attribute that identifies the party owning the device. A device may have more than one owner. This attribute serves as a return pointer back to the user profile 24.

The party profile 24 contains a series of personal identifiers that may consist of Email addresses, Universal Resource locators (URLs), telephone numbers (e.g. E.164 addresses), Private Network Addresses (e.g. Network Service Access Points—NSAP's) and other similar tags assigned to a user. The party profile 24 may also contain many additional pieces of information that can include, but are not limited to: features or services subscribed to; feature activation status; CoS and QoS policies (or preferences) of the user; etc. It is important to note that party profiles 24 can be created for any parties 16, which may be logical entities or real people. User agents or proxy clients, for example, can have party profiles 24. The ECS layer 6 therefore provides for future implementation of Mobile S/W Agents that may roam the network 2 doing tasks on a user's behalf. Such agents can have logical "docking" ports in the network that can be treated in the same manner as real, physical ports to permit the receipt and transfer of messages.

Device profiles 26 include both device attributes and pointers to the network port (not shown) where the device is currently attached. The port may be relatively fixed, such as for wired terminals, or may be transient, such as for wireless terminals. The ECS enabled network 2 assumes any device can be transiently attached to any port. The device may also be contacted through a more permanent "logical" address. For example, behind most portable 800 series telephone numbers is a fixed network telephone number. In some cases the address and the telephone number are one and the same.

A service instance is typically initiated by a content application passing a party identifier of the originating party 16a (FIG. 3), and one or more codes specifying the originating party's communication goals (i.e. the application session requirements) to the Contact Agent 10 (See FIG. 4). Using the originating party identifier, the Contact Agent 10 determines the host directory (e.g. DNS or SCP) that holds the corresponding party profile 24. Requirements for the application session 18 are specified either by the originating party 16a in real-time, by the content application the originating party is using, or as previously entered datafill. Application session requirements are statements of communication class and/or quality-of-service needs in the context of the content application and user preferences. These requirements are used to create a session profile specific to the life cycle of the service instance. The session profile contains information regarding the formatting and movement of information bits for the application session 18. The formatting information specifies media type and/or device requirements while movement information specifies transport behavior preferences. By using different personal identifiers or profile attributes, a party 16 can define different multimedia behaviors that reflect the many roles of a party 16 (i.e. working role, recreational role, or family role). This enables ECS to adapt to the diverse and changing multimedia roles of parties.

Application session requirements are converted by the Contact Agent 10 into one or more communication primitives. A communication primitive is a high-level interface language, agent based or high level Application Program Interface (API), that is used to request communication services. The language articulates requirements regarding how information bits are to be moved and in what format. Other agents or vendor products use primitives to invoke standard or proprietary services. Depending on how the industry evolves, application session requirements (world of applications) and communication primitives (world of networks) may one day standardize on the same interface strategy.

In addition to constructing a profile for the originating party 16a, the Contact Agent 10 also locates and constructs a profile for the receiving party(s) 16b. Location and construction of a party profile 24 for the receiving party can be accomplished by the Contact Agent 10 itself, on the basis of receiving party identification provided by the originating party. Alternatively, the Contact Agent 10 may interact with one or more other Contact Agents 10. For example, a Contact Agent resident on an access provider server may maintain a database of parties accessible via that server. The originating party-facing Contact Agent 10 would then interact with the receiving party-facing Contact Agent 10 (on the access provider server) to obtain a party profile 24 of the receiving party. Each receiving party profile 24 is filtered (i.e. modified) to reflect the communication primitive(s) issued by the origination party. How profiles are filtered is defined by service policies. Both the originating and receiving party profiles 24 are forwarded to the Exchange Agent 12.

Based on application session requirements (originating party goals) and profile information, the Contact Agent 10 can also issue triggers for value added communication services, such as, for example, security, virtual networking, mobility and brokering services.

Exchange Agent

The role of the Exchange Agent 12 is to initiate and maintain a communication session 20 corresponding to the application session 18 for the duration of a service instance. Following party discovery by the Contact Agent 10, it is the responsibility of the Exchange Agent 12 to establish and manage the end-to-end transport of payload data between the involved parties. The term "communication session" in this respect is used in a general sense and reflects the various control techniques used to move information, such as, for example, transaction control for message flows, triggers for routing, switched circuits and stream synchronization.

The ECS system has been designed with the goal of connecting parties together, while simplifying interactions between the parties 16 and the network 2. This means that the Exchange Agent 12 uses the party profiles 24 and the multimedia requirements stated in the communication primitives to synchronize the events between any devices that parties may use and transport services. The Exchange Agent 12 contains networking intelligence, control logic and policy algorithms, capable of responding to the information supplied by the Contact Agent 10.

The Exchange Agent 12 provides network functions, as applied to multi-nodal aspects of communication. Referring to FIG. 6, this agent is functionally divided into partitions providing the following services: Transformation Services 28, Service Management 30, Directory Services 32, Session (Communication) Control 34 and Brokerage 36. The functionality of each of the partitions 28–36 of the Exchange Agent 12 is path independent. Path independent functionality consists of pooled high level network edge, navigational and inter-operation capabilities implemented by means of service and network abstractions. Path associated functions allow services to carry out end-to-end communication using path level abstractions, and are performed by the Transport Agent 14, described below. Transformation 28 and brokerage 36 represent edge centric functionality, while the remaining functional partitions service management 30, directory services 32 and session control 34 are non-edge centric.

Exemplary Path Independent functionality in each partition is as follows: Transformation services 28 includes content format conversions necessary to enable diverse users or user agents to inter-operate. Service Management 30 provides recognition of users, devices and applications and the association of services contracted to them. Either basic transport, or more complex preset special services, may be invoked for individuals or groups. An example of a group oriented service is virtual private networking (VPN). Directory Services 32 entail an automatic compilation of network-wide naming, addressing, locating and route topology information as well as providing the conversion algorithms that can be used for translation between representations used by different sub-networks. Session Control 34 provides preset communication configurations such as those required for multicasting or for VPNs, in addition to providing life cycle and service control for any configuration invoked. Both message and session modes for connection oriented and connectionless communications are supported. Brokerage services 36 enable end user selection of network services.

A connection oriented service instance requires domain-by-domain negotiation of service contracts involving securing connection resources in each domain. In order to maintain session signaling to the greatest extent possible, it is the responsibly the Exchange Agent 12 to initiate, negotiate and secure a transport contact, in terms of service level agreements (SLAs), that reflect the application session requirements. There are several possible control approaches to implement communication session control across many different operator domains (federated networks). For example: the Exchange Agent 12 can dialogue directly with Transport Agents 16 either in a centralized or distributed manner; or the Exchange Agent 12 can dialog with other peer Exchange Agents 12 (in federated networks) either in a centralized or distributed manner. While there are several implementation possibilities, practical constraints such as scalability and end-to-end performance do narrow down the choices. ECS is designed to be an open and scalable with the following assumptions:

- One Exchange Agent 12 is used to provide connectivity control in response to application requirements. The Exchange Agent 12 can exist in any network domain to which the originating party 16 is a subscriber or is the point of access.
- An Exchange Agent 12 within one domain can interwork with any Transport Agents 14 within that domain.
- Transport Agents 14 of one domain can interwork with Transports Agents 14 of other domains.
- An Exchange Agent 12 of one domain can interwork with legacy network domains not possessing Transport Agents 14.
- Exchange Agents 12 of One Domain Can interwork with Value added servers from other domains. Content Service can exist in any domain.
- Exchange Agents 12 can interwork with other peer Exchange Agents 12.

The first step in establishing a communication session 20 of a service instance is the alignment (selection) of suitable devices. Using algorithms designed to recognize text, voice, and video standards, devices are selected from the originating and receiving parties' profiles 24 (provided by the Contact Agent 10) that best meet the communication requirements defined in the communication primitives (i.e the originating party's communication goals). This determines endpoint devices involved in the application session 18. When no match can be found, then suitable formatting transformations are identified, so that end point devices can be selected. The Exchange Agent 12 then identifies the network routing addresses associated with the selected devices. This may involve mapping virtual names (e.g. e-mail, URL and 1-800) to physical address suitable to the transport technology being utilized.

Figure 7:
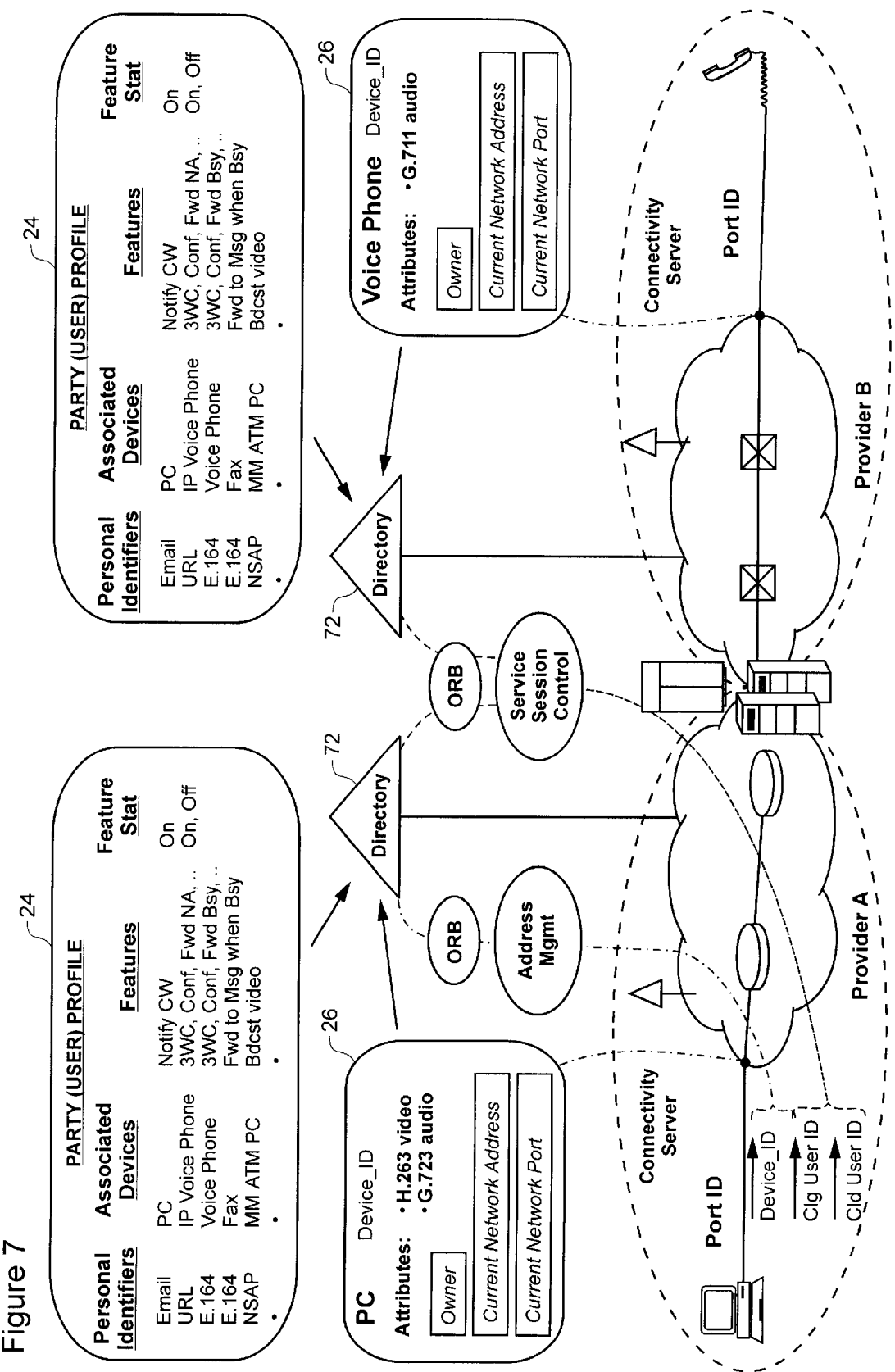
FIG. 7 is a schematic diagram illustrating the use of directories and profiles in the service capable network.

FIG. 7 provides an example of the use of Directories and Profiles to enable both wireless and wire-line mobility in an ECS-enabled network. From the party profiles 24 and device profiles 26, the Exchange Agent 12 can match user capabilities and preferences to effect goal oriented communication. Party and device profiles associated with each user permit the Exchange Agent 12 to configure a goal oriented, workable communication arrangement between the various interacting parties.

Identification of network routing addresses is followed by activation of session controls that are consistent with the device capabilities and overall party requirements reflected in the communication primitives. Session management can vary from thin TCP control for message-based flows, to complete call control for circuit-based streams. The Exchange Agent 12 possesses control policies for management of multimedia data flows. Policies cover a wide range of quality-of-service and connectivity alternatives. Another key part of session control is the ability to adapt between different media, device types, and control protocols. Transformation may occur at the origination, intermediate, or destination points.

It is envisioned that the Exchange Agent 12 will need to interwork with other more specialized agents to deliver value-added communication services, such as mobility, collaboration control and virtual networking controls.

It is the Exchange Agent 12 that specifies how information bits are to be transported. A specific transport primitive is defined for the transport session based on resolution of interworking policies across devices and session types. A transport primitive is a high level language, similar in nature to the communication primitives used to request communication services. The language articulates delay, throughput, reliability, and connectivity requirements in a generic manner such that negotiation can take place with any network provider offering transport services. The transport primitive provides the flexibility to interwork with any vendor technology and adapt to multimedia processing changes. When required, the Exchange Agent 12 acts as a proxy for the communicating parties 16 in the process of negotiating or brokering end-to-end transport services.

Transport Agent

The role of the Exchange Agent 12 is to engage network transport services (in the transport services layer 8 of the network 2) from one or more network providers. The Transport Agent 14 provides functionality that involves locating and activating transport service(s) that meet requirements identified by the Exchange Agent 12. This is where the actual setting up of transport sessions 22 (e.g. circuit connection or data flows) is performed.

Like the Exchange Agent 12, the Transport Agent 14 provides network functions, and is divided into functional partitions providing the following services: Transformation Services 38, Service Management 40, Directory Services 42, Session (Communication) Control 44 and Brokerage 46 (See FIG. 8). However, in the Transport Agent 14, functionality is path associated. Path associated functions allow services to carry out end-to-end communication using path level abstractions.

Exemplary path associated functionality in each partition is as follows: Transformation 38 includes path edge conditioning and proxy clients. Path edge conditioning consists of the control adaptation, message generation and message interpretation required for inter-working between external systems and the ECS layer 6. Proxy clients adapt non-conformant legacy external systems (such as PSTN POTS) so that they can utilize the capabilities of the ECS layer 6. Service Management 40 consists of service configuration, account and policy management. Network management is just another service, albeit a privileged one, that is substantially automated through contracts as will be described below in more detail. Directory Services 42 encompass route selection and interoperability resolution for equipment and services in the communication path. Session Control 44 provides path session activation mechanisms. Brokerage services 46 enable selection of end-to-end communication paths of the appropriate qualities-of-service and provides assembly of contract details for the enhanced sub-layer.

In order to provide openness and scalability, Transport Agents 16 of one domain (network) are designed to inter-work with Transport Agents 16 of other domains (federated networks).

One possible implementation scenario is that for first time users, new transport service requests and session changes are negotiated between consumer and supplier. Repeat users, using pre-negotiated service packages, need only be authorized or recognized. Key to the negotiation process is the concept of real-time brokering of a transport contract. A contract embodies the terms (money), conditions (policies), and services (network primitives) that apply for the life cycle of the multimedia session. This approach enables the entire process of selecting a network provider to be automatic and universal.

Negotiation and brokerage are important aspects of next generation networks because of the high probability that future network providers will be offering numerous transport alternatives. In addition, establishing end-to-end interoperability will be difficult to achieve because of a heterogeneous network environment consisting of many operators and transport technologies. Parties will be free to choose between competing network providers and their respective QoS offerings. The Transport Agent 14 enables network providers to offer transport alternatives in this competitive environment.

Fundamental to the negotiation process is making a match between what the consumer requires and the provider is offering. The term 'broker' is used to refer to the entire process of locating and negotiating such a match. The broker process can be controlled by either the network provider or by an independent company (third party).

The benefit of brokers in component-based architectures can be shown by analogy to how search engines benefit people surfing the WEB. The Exchange Agent 12s can discover other instances of similar transport services by querying the Transport Agent 14 for similar service descriptions. Once found, transport services are negotiated and utilized.

Brokers can be controlled by network provider policies. They dialogue directly with the Exchange Agent 12. When controlled by a network service provider, the Transport Agent 14 is capable of negotiating a contract, mapping the network primitive to a suitable QoS/CoS transport resource, and supporting contract administration. Negotiation also provides a means of obtaining end-to-end QoS commitment across multiple network providers and heterogeneous transport technologies. When required, the Transport Agent 14 acts as a proxy for network operators in the process of activating or brokering end-to-end transport services.

Independent companies control generic brokers. In this case, Transport Agents 22 provide browsing and location services. It is envisioned that the Transport Agent 14 may be empowered to negotiate on the network provider's behalf, much like an insurance broker.

Primitives

Figure 9:
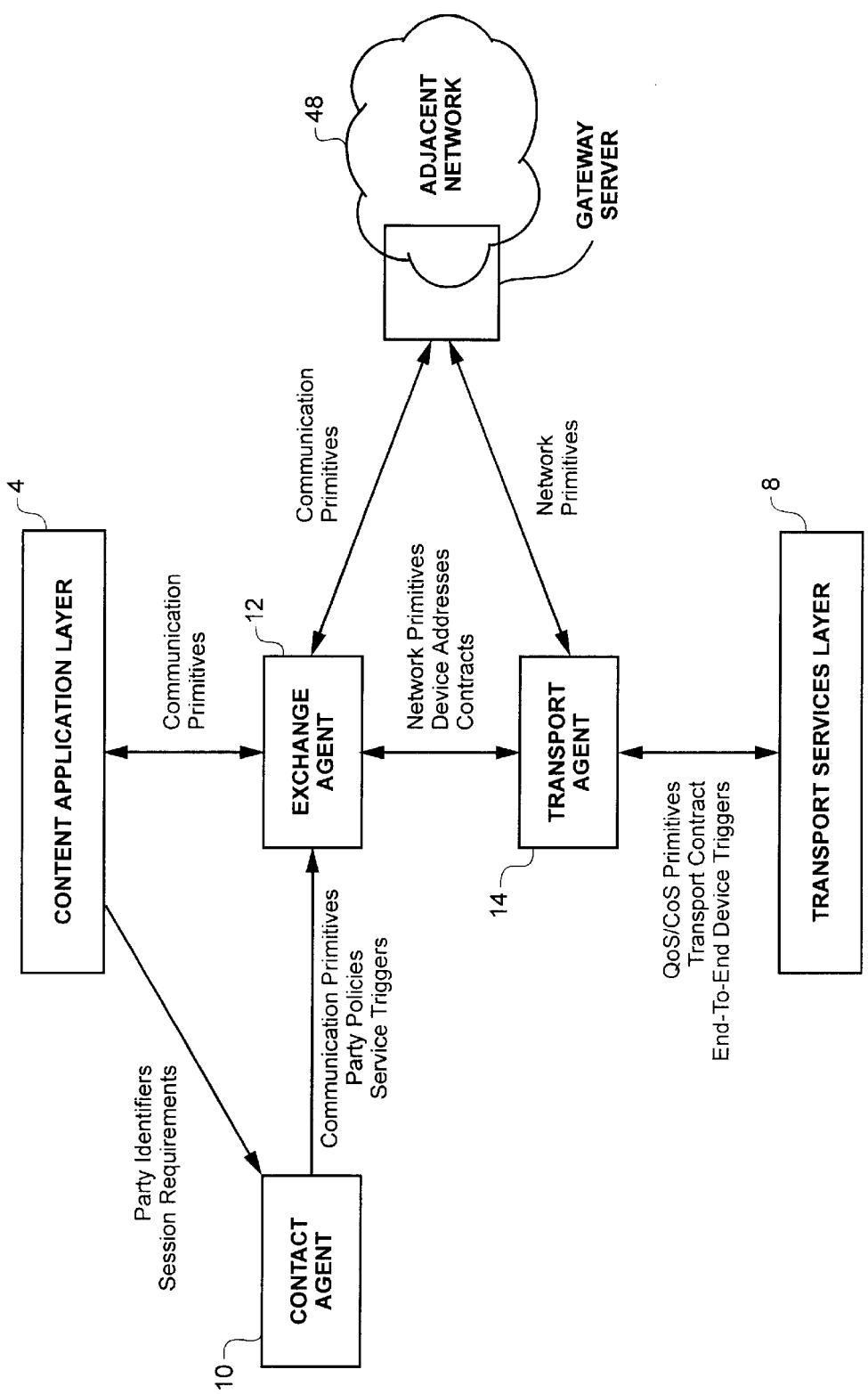
FIG. 9 is a schematic diagram illustrating the use of primitives enabling interaction between the content Application layer, ECS, Transport Services layer, and adjacent networks.
Figure 10:
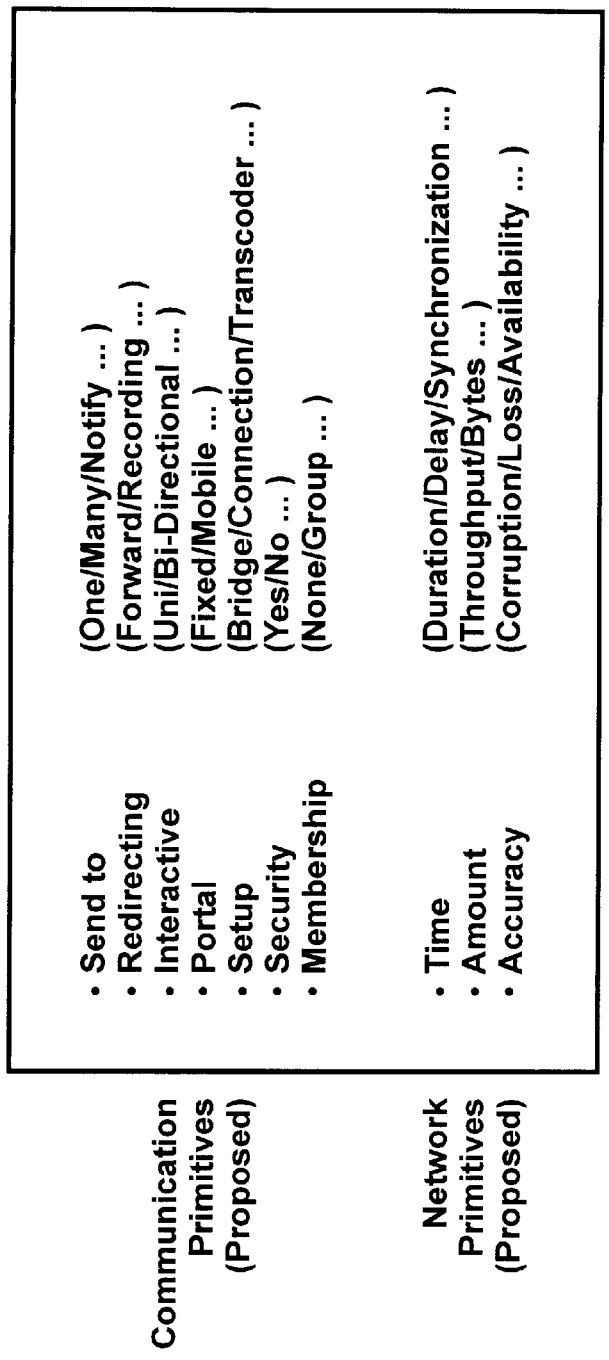
FIG. 10 is a schematic diagram illustrating exemplary primitives used in the ECS of the present invention.

User applications in the content application layer 4, the Contact Agent 10 and adjacent networks 48 interact with the Exchange Agent 12 using communication primitives. The Exchange Agent 12 and adjacent networks 48 interact with the Transport Agent 14 using network primitives. FIG. 9 shows how primitives are communicated across layer boundaries to interact with layer edge functionality as well as within layers between edge functions. FIG. 10 shows examples of both communication and transport primitives. The list of examples shown in FIG. 10 is exemplary only and not intended to be exhaustive.

Communication primitives are abstractions that enable users, user agents or adjoining networks to interact with the ECS to initiate, maintain and terminate communication services for a wide variety of content. The communication primitives consist of basic instructions sent to the Exchange Agent 12, and subsequent responses returned by the Exchange Agent 12 to enable dialog with ECS functions. The communication primitives enact fundamental communication behaviours from which more complex services can be derived.

Network primitives are similar abstractions that enable users, user agents, Exchange Agent 12 functionality or adjoining networks 48 to interact with the Transport Agent 14, and thus the Transport Services Layer 8 of the network 2. The Transport Agent 14, in turn, implements universal Class or Quality-of Service Primitives that permit network services to initiate, maintain and terminate communication paths over any of a variety of transport technologies. Network services are unaware of transport technology.

Communication and Network primitives employ a syntax that is universally recognizable by users. Primitives cover the semantics of user-network control information exchanges encompassing; (a) user and provider policy information, (b) communication service selections, (c) content adaptation selections, (d) and quality-of-service selections. Different primitive messages are used within the enhanced communication services layer 6 and the transport services layer 8, and between different functions within the layers 6, 8.

Primitives must be simple and easy to use and, for the most part, concise and limited in number. Their format is not unlike software language instructions in that they consist of an 'instruction code' part followed by a string of one or more arguments. Simplicity and ease of use is required because they are intended for use by a diverse population of software application programmers and graphic user interface (GUI) designers. Further, they are intended to embody requests and responses to fundamental communication services provided by the ECS-enabled network that can be used to construct more complicated communication applications by end-users or third party service suppliers. Because the couplings between network layers must be designed to be amenable to separate layer ownership, the primitives must be easy to implement and must be exposable to different parties.

Agent Collaboration Modes

As described above, the Contact, Exchange and Transport agents 10, 12, 14 are provided as independently evolved logical entities which are designed to operate together to provide the functionality of the ECS layer 6. Together with primitives, the agents define a universal architectural framework for building and offering multimedia services. As such, various modes of collaboration between the agents are possible. Each collaboration mode offers its own functionality, and thus a particular mode can be selected during initialization of a service instance to best suit the communication needs of the involved parties. In the following sections, two exemplary collaboration modes are presented with reference to FIGS. 11 and 12.

Figure 11:
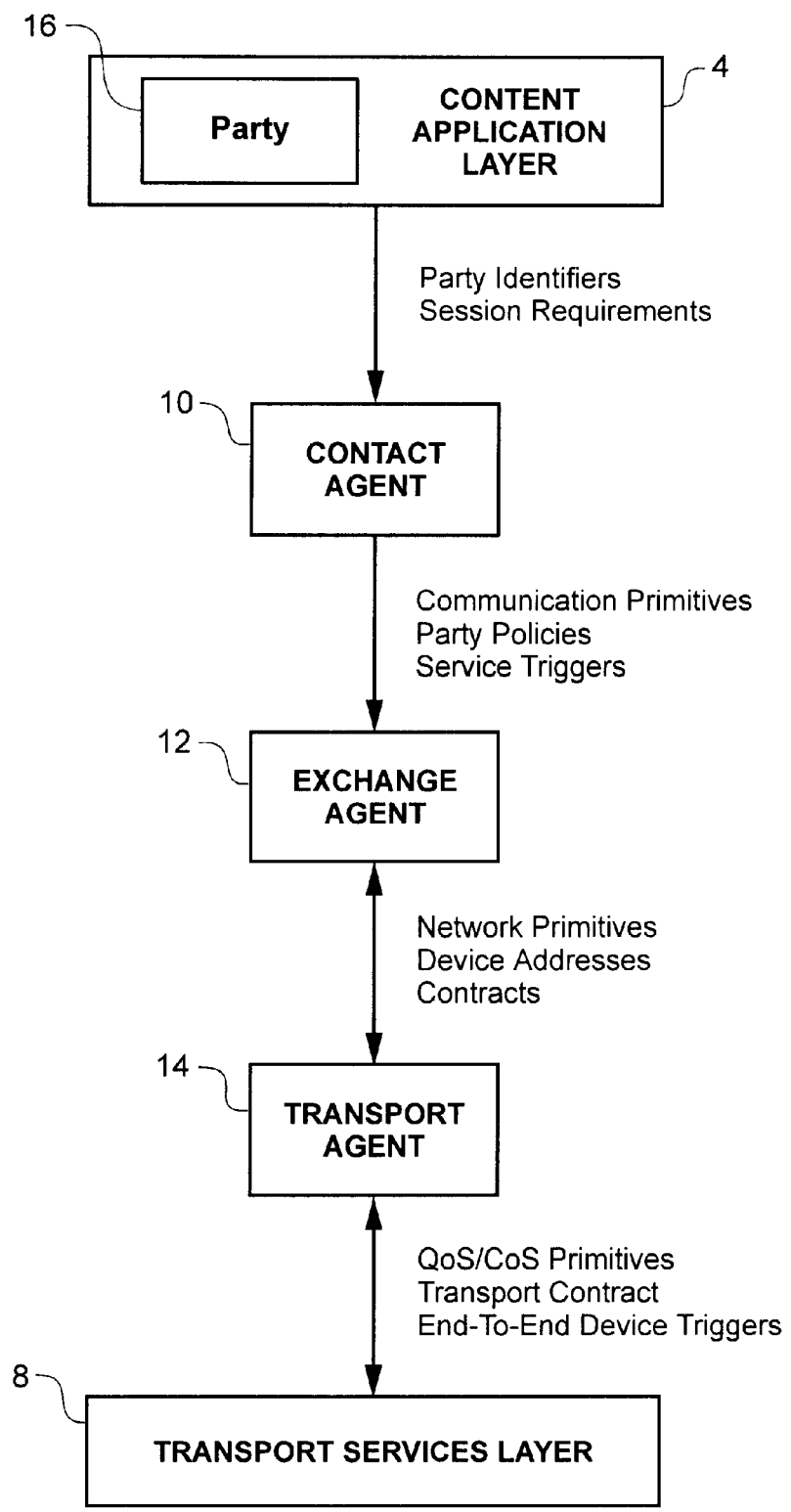
FIG. 11 is a schematic diagram illustrating a streaming collaboration mode among the Contact Agent, Exchange Agent and Transport Agent.

Referring now to FIG. 11, under a "streaming collaboration" mode, a party 16 operating in the content application layer 4 interfaces exclusively with the Contact Agent 10. In response to party identifiers and session requirements received from the party 16, the Contact Agent 10 resolves virtual addresses and constructs profiles 24 of the originating and receiving parties (party discovery), and generates one or more communication primitives setting out application session requirements, all as described above. The Contact Agent 10 then passes the party profiles 24 and communication primitives to the Exchange Agent 12, which establishes and maintains a communication session 20 providing end-to-end connectivity for the duration of the service instance. Brokerage and engagement of network services layer 8 media (the transport sessions 22) is conducted by the Transport Agent 14 in response to network primitives, addresses and device triggers issued by the Exchange Agent 12.

It will be seen that in the streaming collaboration mode, the agents interact with each other, with minimum input from the party 16. Accordingly, streaming collaboration provides highly simplified access to the ECS enabled network 2, and thus is particularly suitable in service instances initiated by users employing simple communication devices, (e.g. a telephone hand-set) and where service requirements are not demanding (e.g. set-up of a voice-only connection). Streaming collaboration will also be appropriate where end user preferences (e.g. CoS and QoS requirements, roles, etc.) are predefined and accessible to the Contact Agent 10 during party discovery.

Figure 12:
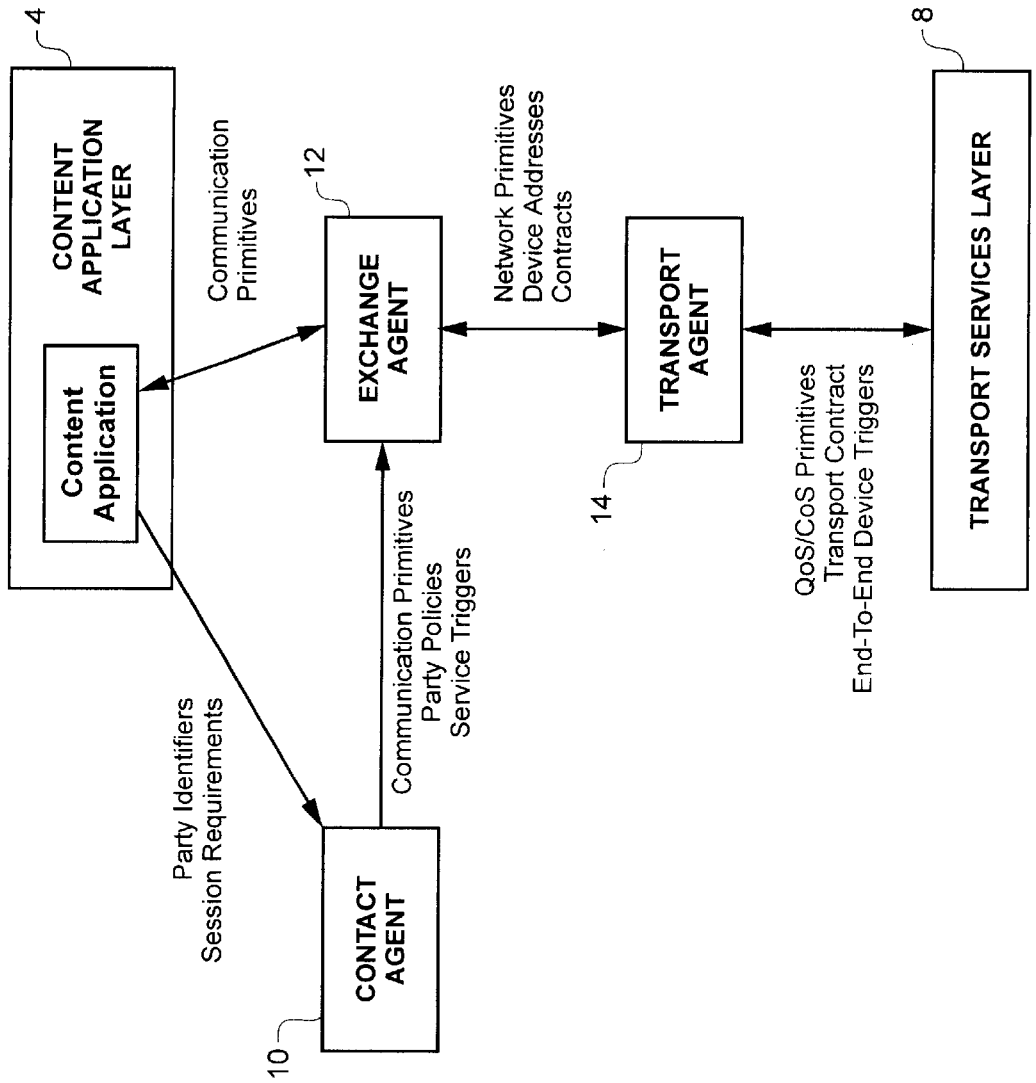
FIG. 12 is a schematic diagram illustrating an application-centric collaboration mode among the Contact Agent, Exchange Agent and Transport Agent.

Referring now to FIG. 12, "application centric" collaboration entails active interaction between a content application (e.g. a browser, enhanced edge functionality provided by a network access provider etc.) in the application service layer 4 and the Exchange Agent 12 during a service instance. In this case, the content application interacts with the Contact Agent 10 to resolve virtual addresses and to obtain party profiles 24. These are then passed to the Exchange Agent 12 in order to begin set-up of the communication session 20. During this process, and possibly subsequently through the duration of the service instance, the content application interacts directly with the Service Management 30, Session Control 34 and Brokerage Services 36 of the Exchange Agent 12, by means of communication primitives, to dynamically select network services in accordance with the end user's requirements and preferences.

In this collaboration mode, the Contact Agent 10 is used to provide party discovery functionality to the content application, and the Transport Agent 14 acts as a slave to the Exchange Agent 12, engaging transport layer 8 services in response to network primitives, addresses and device triggers issued by the Exchange Agent 12.

Exemplary Call Walk-throughs

The following paragraphs present three exemplary call walk-throughs in the ECS enabled network. The first exemplary call walk-through is a multimedia conference call involving an originating user on an IP site network; a first receiving user, also located on the IP site network; and a second receiving user located on a federated legacy TDM network. The second exemplary call walk-through illustrates "Premium Delivery" of e-mail, and the final exemplary call walk-through is a real-time voice call.

Multimedia Conference Call

Figure 13:
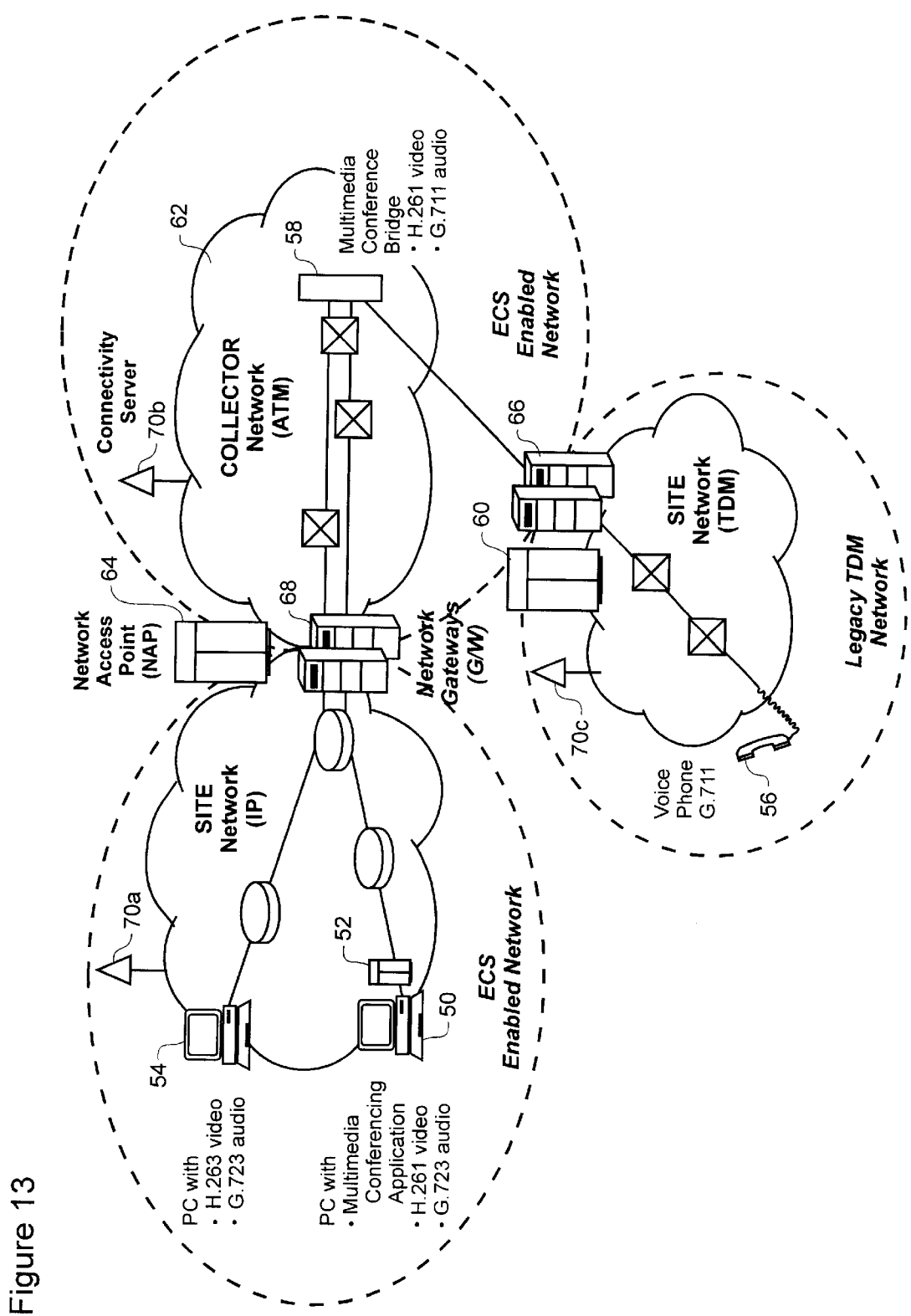
FIG. 13 is a schematic diagram of a network topology used to illustrate an exemplary call walk-through in an ECS-enabled network.

FIG. 13 illustrates the network topology used for a multimedia call-walk-through in the ECS enabled network.

Figure 14A:
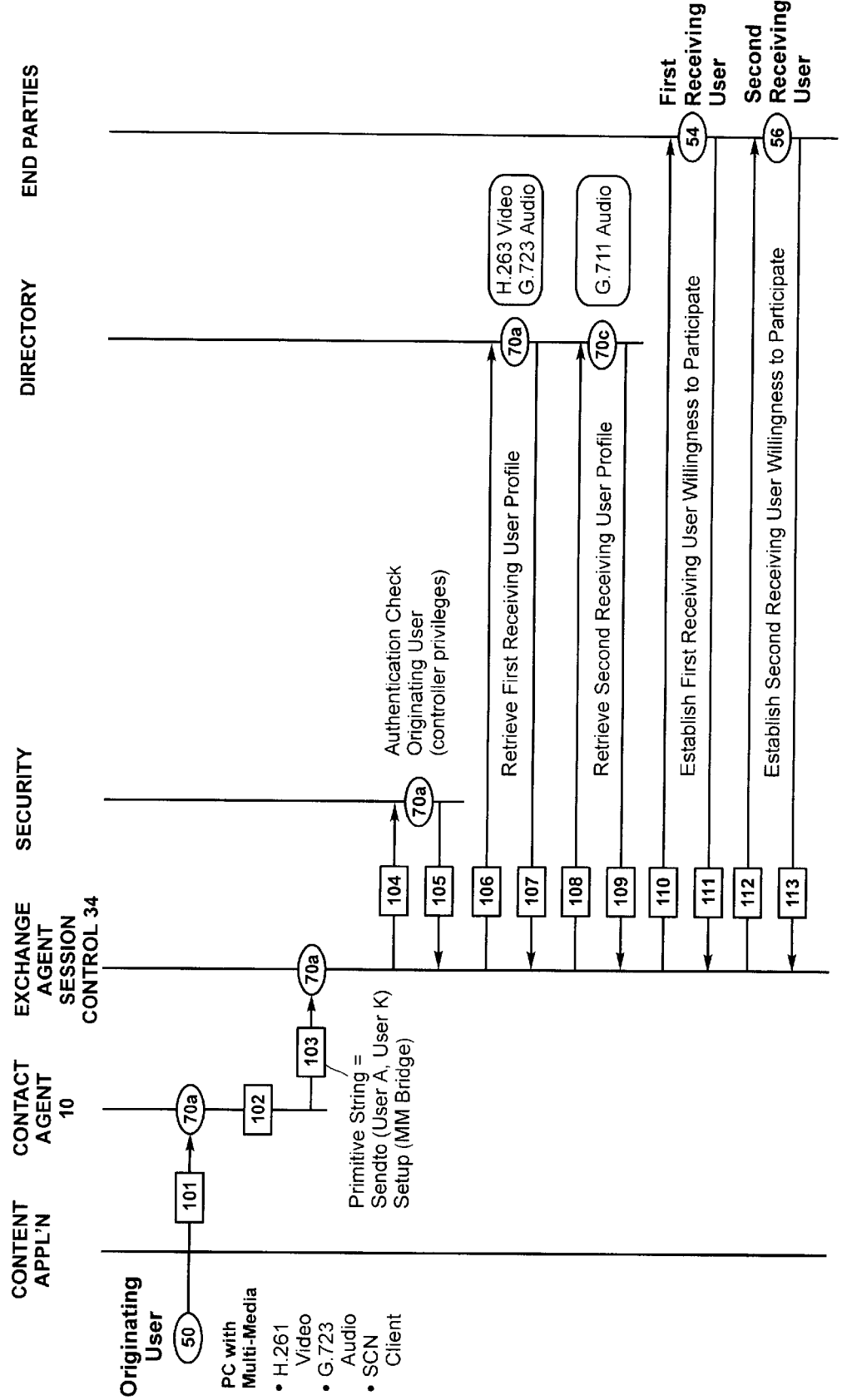
Figure 14B:
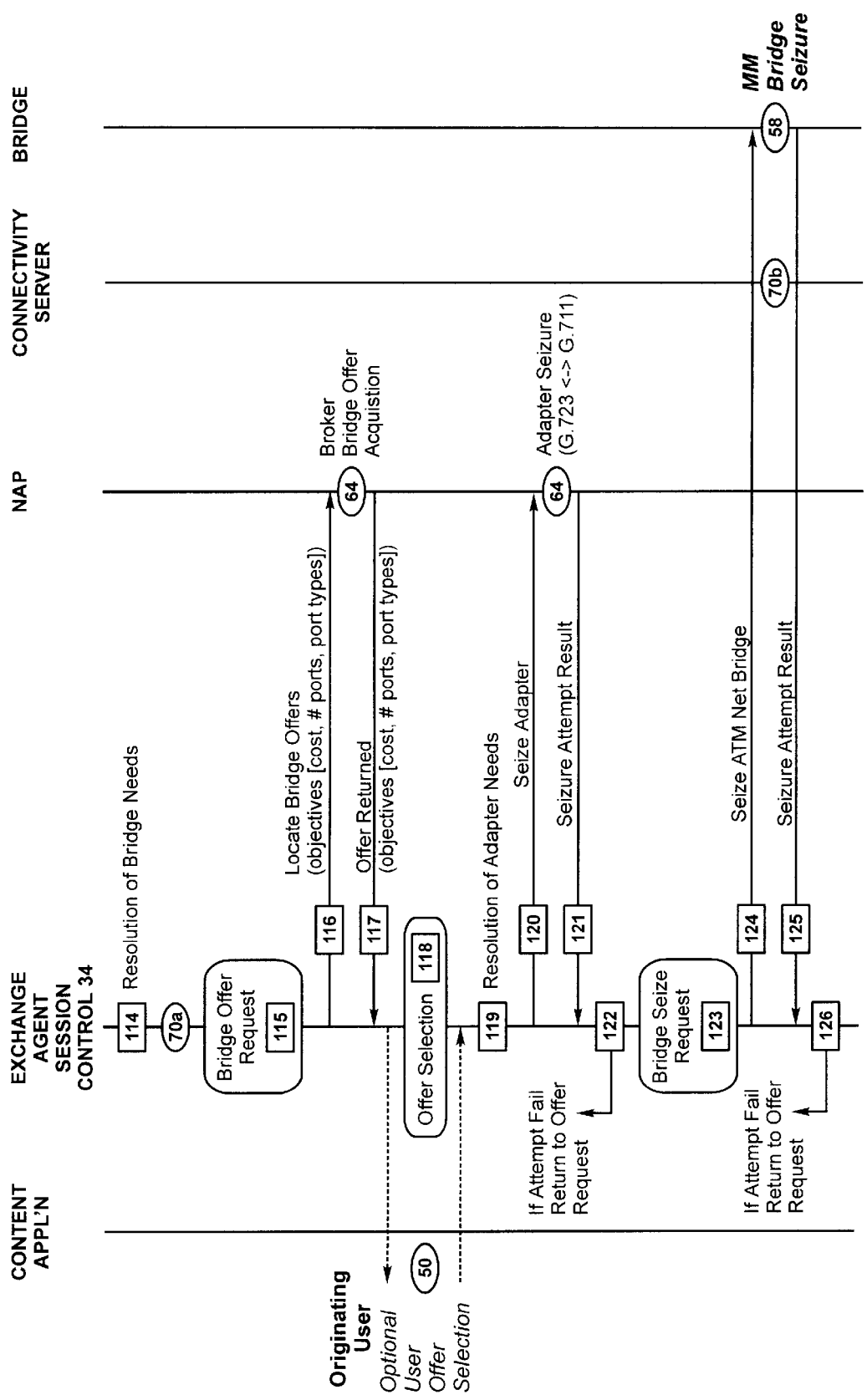
Figure 14D:
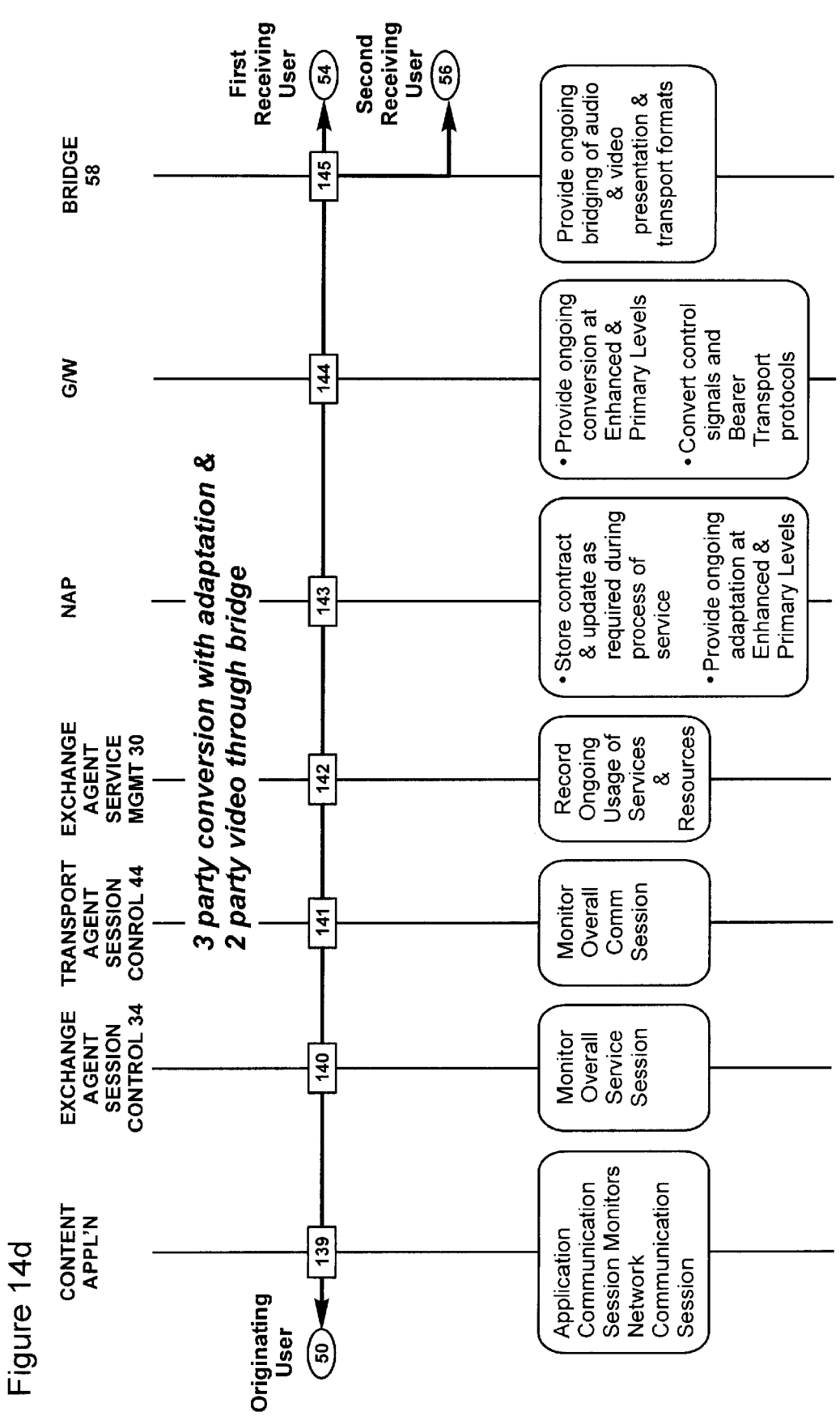

An Originating user at a Multimedia PC 50 running a multimedia conferencing application wishes to access the ECS-enabled network to set up a conference. The multimedia PC 50 has an "thin" broker client 52 that provides APIs (primatives) for accessing the ECS layer 6 of the ECS enabled network 2. The primitive strings shown in FIG. 14a–c are communication and network primitives while those shown in FIG. 14d are transport primitives.

The Originating user at multimedia PC 50 wishes to communicate with a first receiving user 54 in the same (IP) network and a second receiving user 56 in another (TDM) network via an intermediate (ATM) network that also provides a multimedia bridge service 58. Originating User's multimedia PC 50 is capable of video conferencing, using the H.261 standard, and audio conferencing using G.723 standard. The first receiving user's PC 54 is capable of H.261 video and G.723 audio. The second receiving User 56 has a standard (POTS) voice phone that adheres to the G.711 standard, which is served by a telephone switch in a legacy TDM network. The legacy TDM network interfaces the ECS enabled ATM network through a Network Access Point (NAP) 60. The NAP 60 provides a proxy client for the voice phone 56. The proxy client, in NAP 60, is capable of cleanly separating voice content, and telephone set signaling, from transport so that information at the transport level need not be examined within the ECS enabled network. In addition, the proxy client is capable of mapping the telephone set signals into primitives to utilize some of the enhanced capabilities of the ECS enabled network. (Use of broker-related primitives by the proxy client takes place if the telephone set were the originator of the conference, but since the telephone set is a receiver in this example, the use of primitives by that terminal is not described.) The clean separation of transport and content in ECS enabled networks means that legacy terminal signaling must be "conditioned" or mapped into ECS enabled network control signals in the proxy client. CCS7 has been assumed as the control signaling protocol in this example. Other, newer control signaling protocols have been (or currently are being) developed, in particular for broker-network interaction and for other signaling as well. A broker signaling converter may be devised to utilize CCS7 (or other currently used, transport de-coupled signaling protocol).

In this particular example, the multimedia bridge service 58 provided in the ATM network, is used to establish the multimedia conference. The bridge service 58 could be provided by either the collector network 62 operator or a 3rd party. This multimedia bridge 58, acquired through an Exchange Agent Connectivity Brokerage Service 36, provides bridging for H.261 video and G.711 audio. Because the two PCs 50, 54 in the IP Site network utilize G.723 highly compressed audio, the Network Access Point 64 must be called upon to apply adapters to voice connections between both IP network PCs 50, 54 and the multimedia bridge 58 so that the PC's 50, 54 can make use of the multimedia bridge 58 using the ATM collector network 62.

Adaptation service is an edge service that the originating user may request through primitives. However, the required attributes of both the multimedia bridge 58, and the adapters can be deduced by the Exchange Agent Session Control 34 by examining the user and device profiles (of all of the involved users) stored in Service Provider directories.

Adapters are required in this walk-through because the multimedia bridge 58 actually acquired by the Exchange Agent Connectivity Brokerage Service 36 does not exactly provide the conversion attributes needed for the terminal involved.

Network gateways 66, 68 provide the necessary "conditioning" in both the ECS and transport services layers 14, 16 to permit networks consisting of different technologies to couple. In the ECS layer 6 gateways 66, 68 provide the necessary transport independent signaling conversions, and in the transport layer 8 gateways 66, 68 provide transport protocol conversions (IP⇌ATM, ATM⇌TDM).

Brokerage services software (not broker clients) reside on the NAPs 60, 64 and acquire service provider service offers posted on the NAPs 60, 64. Normally NAPs 60, 64 are not required between two ECS enabled networks because all information movement through the two networks has clear Content/Transport layer separation. Transformation is provided at ECS enabled networks edges to permit interfacing with other ECS incompatible networks. Gateways 66, 68 are always required between any two incompatible networks.

In future, networks will likely have network-wide ECS and transport layer control logic centered in connectivity servers 70a–c that are divorced from actual transport nodes. Only tightly coupled path logic will be resident in nodes. This separation applies to NAPs 60, 64 and gateways 66, 68 as well as nodes. Thus, in the present walk-through, most of the control logic resides in the connectivity servers 70a–c. Connection control logic for edge-to-edge paths across a single Provider domain is preferably also in the connectivity servers 70a–c.

The present walk-through assumes that, in the ECS enabled IP site network, the Exchange Agent Brokerage Services 36 is resident in NAP 64 while only the broker client 52 is resident in the multimedia PC 50. It is also possible to locate both the broker 36 and broker client 52 in an ECS compatible PC. In such cases, the PC would, in effect, contain a NAP 64.

The example walk-through focuses on connection oriented bearer communication paths. Their session infrastructure is utilized in the walk-through. As described above, the ECS enabled IP network also accommodates connectionless, message-oriented paths and associated "sessions", but such connections are not described by way of example. They too make use of primitives but usually do not require a proxy client 64, because content and transport are already cleanly separated. In addition, paths established to carry signals themselves, e.g. broker or network control signals, exist but have not been described or illustrated. Their setup is well understood by persons skilled in the art.

The walk-through uses a centralized session control model (like a SCP), therefore most of the session control is in one Connectivity Server 70a. A highly distributed version can be developed which distributes session control and session logic to a greater extent across connectivity servers 70a, b and c.

FIGS. 14a to 14c portray the sequence of events that take place in the enhanced communication services layer 18 during the multimedia conference setup phase. The steps in this process are as follows:

101. A Content Application [multimedia conferencing] on multimedia PC 50 sends a session establishment request to the Contact Agent 10 (resident in the multimedia PC 50 or connectivity server 70a) as a string or primitives identifying the originating user, each of the receiving users, and the session requirements (i.e. the communication goals of the originating party). In this case, the session requirement is for a multimedia conference.

102. The Contact Agent 10 utilizes party discovery logic and directory services to obtain party profiles for each of the involved users, and to assemble a string of one or more communication primitives specifying the communication requirements.

103. The party profiles and communication primitives are then passed to the Exchange Agent 12.

104. Exchange Agent Session Control 34 logic resident in Connectivity Server 70a identifies originating user multimedia PC 50 and queries a Security Server (not shown) for data on the user of multimedia PC 50.

105. The Security Server [assumed to be part of Connectivity Server 70a] performs an authorization and authentication check on the user of multimedia PC 50. Multimedia PC 50 is authorized to set up multimedia conferences and to act as the conference controller. [Security could be on another server e.g. Directory Server 72 (FIG. 6)]. The Security Server returns the result that the originating user passes authentication and authorization.

106. Exchange Agent Session Control 34 requests the first receiving user 54 profile 24 from the Directory Server 72.

107. The directory server 72 extracts the profile 24 [which indicates that the first user 88 has H.263 Video and G.723 Audio capability] and packages the result for transmission to Exchange Agent Session Control 34. Directory server 72 sends the profile to Exchange Agent Session Control 34.

108. Exchange Agent Session Control 34 requests the second receiving user 56 profile 24 from the Directory Server 72.

109. The Directory server 72 extracts the profile 24 [which indicates that the second user 56 has G.711 Audio capability] and packages the result for transmission to Exchange Agent Session Control 34. The directory server 72 sends the profile to Exchange Agent Session Control 34.

110. Exchange Agent Session Control 34 sends a message to the first receiving user 54 to determine if they will participate in the conference.

111. The first receiving user 54 returns a message indicating willingness.

112. Exchange Agent Session Control 34 sends a message to the second receiving user 56 to determine if they will also participate in conference.

113. The second receiving user 56 returns a message indicating willingness.

114. From the three party profiles [50, 54 and 56], Exchange Agent Session Control 34 determines that a multimedia bridge with two H.263 ports, two G723 ports and one G711 port is required.

115. Exchange Agent Session Control 34 formulates a multimedia bridge request for two H.263 ports, two G.723 ports and one G.711 port. The request contains the user submitted primitive attributes that represent contract cost objectives. [Note: H.261 & H.263 can inter-work with QCIF format].

116. The Exchange Agent Session Control 34 sends the bridge request to the broker located on NAP 64.

117. The broker scans bridge service offers posted in all accessible NAPs and returns the nearest matched offers to the Exchange Agent Session Control 34 in connectivity server 70a.

118. The Exchange Agent Session Control 34 can either forward the nearest set of matches to the originating user 50 for selection of a Bridge, perhaps based on condition of cost, or can automatically select the nearest match.

119. After the bridge selection has been made Exchange Agent Session Control 34 finds that the bridge is not an exact match so Exchange Agent Session Control 34 determines what adapters are required to make communication possible with the selected bridge and formulates an adapter seize request. [The system's automatic determination capability is used to simplify communication for the user].

120. Exchange Agent Session Control 34 forwards a G.723⇆G.711 Adapter seize message to the local NAP 64.

121. The NAP 64 seizes the adapter and notifies Exchange Agent Session Control 34 of its ports.

122. If adapter seizure fails the Exchange Agent Session Control 34 returns to the bridge offer request in case the user (or system) wants to make an alternative bridge selection.

123. If the adapter is successfully seized, Exchange Agent Session Control 34 formulates a bridge seize request for the selected bridge.

124. Exchange Agent Session Control 34 forwards the seize request to the connectivity server 70b controlling the bridge which then accesses and seizes the bridge 58.

125. The connectivity server 70b returns the seize result including the port #'s and types to Exchange Agent Session Control 34.

126. If the seize attempt failed, Exchange Agent Session Control 34 would return to the bridge offer request point to allow reselection.

127. If the Bridge seizure was successful Exchange Agent Session Control 34 notifies the NAP 64 that presented the chosen Bridge offer that the Contract was acceptable.

128. Exchange Agent Session Control 34 also sends a message to Exchange Agent Service Management 30 indicating the contract was accepted and that acquisition of enhanced resources [bridge and adapter] should be recorded and added to the service invoice.

129. Exchange Agent Session Control 34 can now proceed to acquire and attach the necessary communication path resources. Exchange Agent Session Control 34 forwards a request including a list of all the ports needed to be connected to Transport Agent Session Control 44, also resident in the connectivity server 70a. Connection descriptions include end user port addresses [from profiles] and auxiliary component ports (i.e. the bridge [in ATM collector network 62] and adapters [in NAP 64]. Connection requirements are forwarded with the ports and include primary services primitive attributes including cost objectives, QoS Security Level, and Interactivity required [FDX, HDX, Broadcast, Unicast, Multicast etc.].

130. Transport Agent Session Control 44 formulates a series of communication path requests to be forwarded to the Transport Services Layer 8 [activities described in FIG. 11f]. The Transport Services Layer 16 returns details about the paths selected. These details include a list of the connections established, including those made through selected network gateways 66, 68 and enhanced service auxiliary components.

131. If the Transport Services Layer 8 fails to establish connections, Exchange Agent Session Control 34 is directed to go to its termination phase.

132. The returned transport services resources (communication paths) are bound to the connectivity session.

133. A list of transport services resources and their attributes is forwarded to Exchange Agent Session Control 34 in connectivity server 70a.

134. All resources used in both the enhanced communication and transport services layers 6, 8 are now bound into the overall service instance.

135. Exchange Agent Session Control 34 now sends a message to Exchange Agent Service Management 30 in connectivity server 70a indicating that enhanced resource usage has started under the terms of the brokered electronic contract.

136. First receiving User 54 is notified that his connections have been established.

137. Second receiving User 56 is notified that his connections have been established.

138. Originating user at multimedia PC 50 is notified that the receiving users 54 and 56 are connected.

FIG. 14d (including steps 139–145) indicates the behaviour of some of the major functional components during the conference active phase.

Figure 14E:
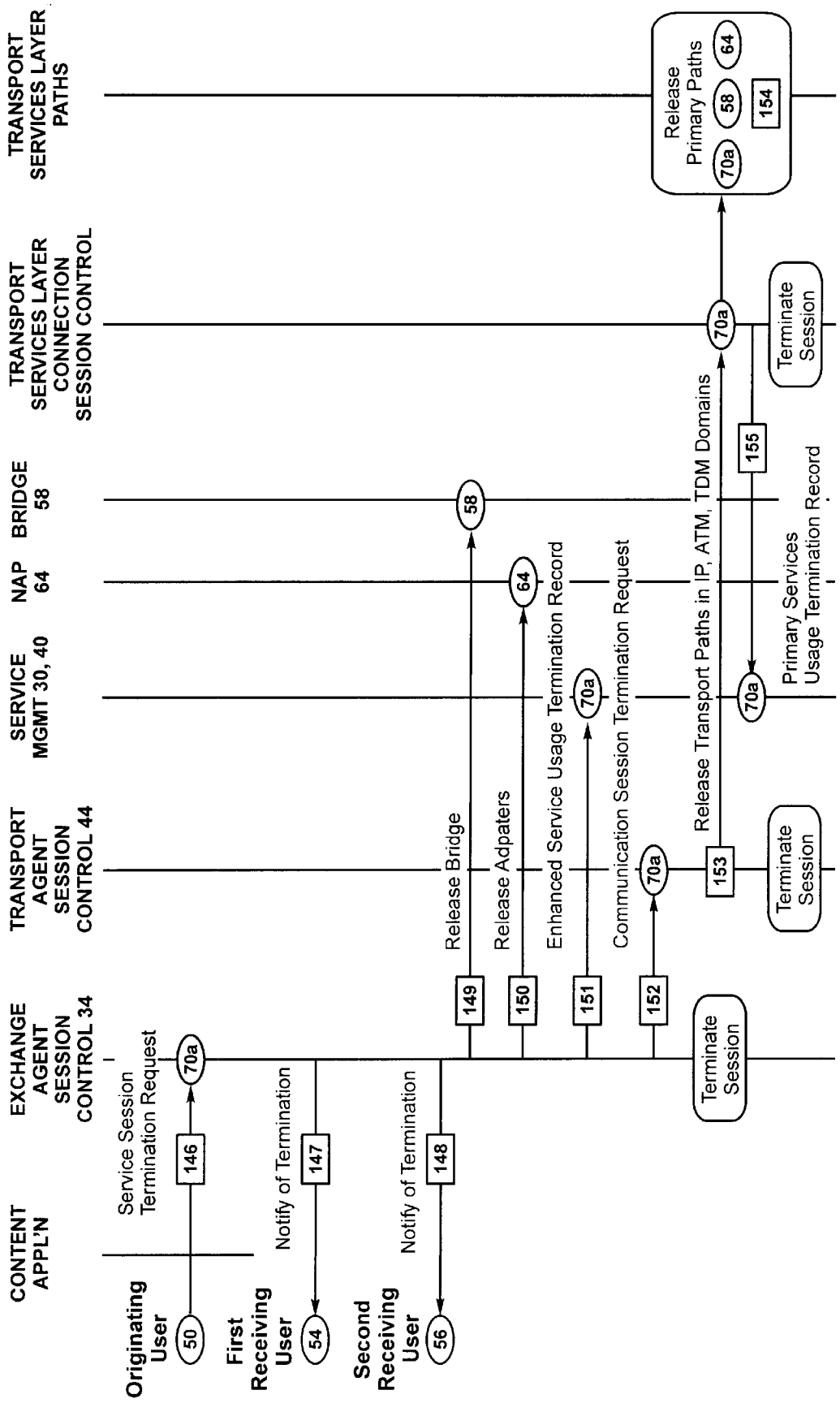

FIG. 14e portrays the sequence of events that take place in the ECS layer during the multimedia conference takedown phase. The steps in this process are as follows:

146. Originating User at multimedia PC 50 terminates the conference. Originating User 50 signals termination of the multimedia conference to Exchange Agent Session Control 34 in connectivity server 70a either by exiting the application window or by generating appropriate communication primitives.

147. Exchange Agent Session Control 34 sends a message to the first receiving user 54 notifying of conference termination.

148. Exchange Agent Session Control 34 sends a message to the second receiving user 56 notifying of conference termination.

149. Exchange Agent Session Control 34 sends a release message to the connectivity server 70b that supervises the multimedia conference bridge 58. The connectivity server 70b, in turn, releases the bridge 58.

150. Exchange Agent Session Control 34 sends a message to the NAP 64 to release the adapter.

151. Exchange Agent Session Control 34 notifies Exchange Agent Service Management 30 to record service usage termination for billing purposes.

152. Exchange Agent Session Control 34 notifies Transport Agent Session Control 44 of the conference termination then terminates the service session.

153. Transport Agent Session Control 34 forwards a request to the Transport Layer 8 to release all transport paths and associated resources then terminates the connectivity session.

154. Transport Layer Path Controllers release primary paths/connections under their jurisdiction.

155. Transport Layer Connection Session Control forwards a message to service management 30, 40 indicating the end of usage of Transport Layer services for billing purposes then terminates the connection session.

Figure 14F:
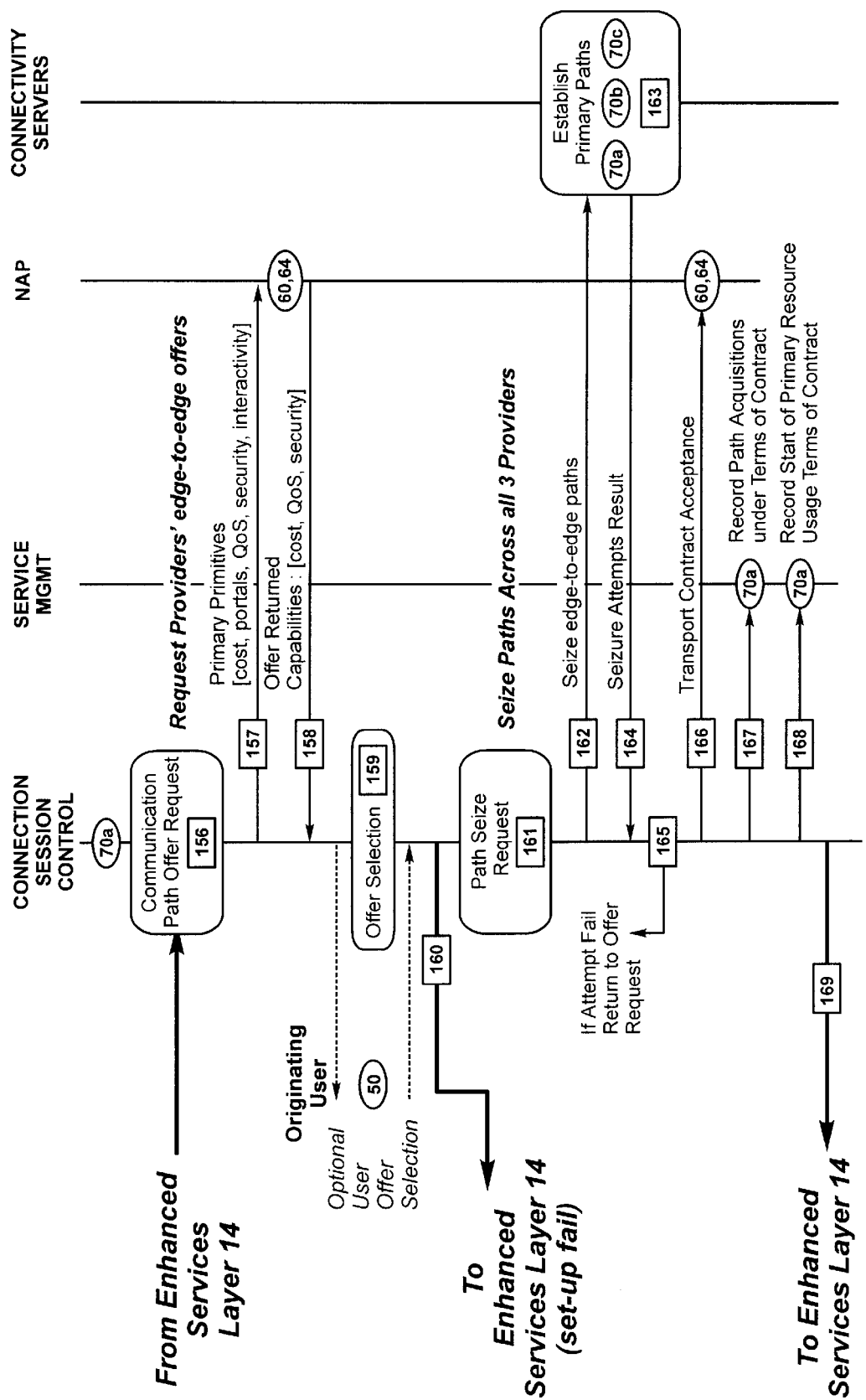

FIG. 14f portrays the sequence of events that take place in the Transport services layer during the multimedia conference setup phase.

156. Transport Services Layer Connection Session Control receives connection descriptions including end user port addresses [from profiles 24] Service Auxiliary component port addresses [for the bridge 58 in the ATM collector network 62 and the adapter in NAP 64]. Connection attributes forwarded include the primary communication primitives and parameters associated with communication path cost objectives, QoS, Security Level, and Interactivity [i.e. FDX, HDX, Broadcast, Unicast, Multicast etc.]. Connection Session Control formulates Path offer requests.

157. Path offer requests are forwarded to the transport Agent connection brokers on NAPs 60 and 64 serving the networks where end-user, service auxiliary and gateway ports reside.

158. Path offers are returned by each of the brokers. The offers include the attributes of selected paths. [Cost, QoS, Security, etc.]

159. Path offers may be forwarded to user, user agent or application for offer selection or the brokers may alternatively select offers for use by Connection Session Control.

160. If no valid offers remain, or all offers have been attempted, or the user requests abandon, the Transport Services layer 8 returns a service session termination request to the Transport Agent 14.

161. Connection Session Control formulates Path Seize requests for selected offers.

162. Connection Session Control forwards edge-to-edge path seize requests to connectivity servers 70a, 70b and 70c in each network domain.

163. Local connectivity servers 70a–c attempt to establish connections.

164. Local connectivity servers 70a–c respond with seizure attempt results.

165. If seizure attempts fail, Connection Session Control returns to the path offer request point.

166. Connection Session Control forwards a Transport services contract acceptance message to NAPs 60 and 64.

167. Connection Session Control notifies service management of path acquisitions under the terms of contract.

168. Connection Session Control requests recordal of the start of transport resource usage.

169. Connection Session Control notifies Transport Agent Session Control 44 in the ECS layer [in connectivity server 70a] that the communication path request is complete.

FIG. 15 is a table showing the connections, adaptations, bridges and conditioning conversions performed during the call walk-through described above. It should be understood that a network signaling protocol change between networks in the enhanced communication and/or transport services layers 18, 20 would normally require conditioning at intervening gateways 98. However, for the purposes of the call walk-through described above, Signaling System 7 has been assumed for both layers throughout so no signaling conditioning was required.

The embodiments of the invention described above are intended to be exemplary only. Changes and modifications will no doubt become apparent to those of skill in the art. The scope of the invention is therefore intended to be limited solely by the scope of the appended claims.

I claim:

1. An Enhanced Communication Services layer for controlling a service instance of a communication network comprising a content application layer adapted to generate payload data of the service instance and a transport services layer comprising a physical fabric of the communication network and adapted for end-to-end transport of the payload data between parties involved in the service instance, the Enhanced Communication Services layer comprising:
    a) a Contact Agent adapted to discover information identifying respective communications capabilities of an originating party and at least one receiving party of the service instance;
    b) an Exchange Agent responsive to the Contact Agent and adapted to select, from a network space comprising one or more transport services, a best match set of transport services for satisfying a communication goal of the originating party in respect of the service instance; and
    c) a Transport Agent responsive to the Exchange Agent for engaging the selected set of transport services for a duration of the service instance.

2. An Enhanced Communication Services layer as claimed in claim 1, wherein the Contact Agent is responsive to a set of primitives generated by the content application layer and adapted for identifying, in respect of the service instance, the originating and receiving parties; and the communication goal of the originating party.

3. An Enhanced Communication Services layer as claimed in claim 2, wherein the Contact Agent is operative to construct a profile of each party involved in the service instance.

4. An Enhanced Communication Services layer as claimed in claim 3, wherein the Contact Agent comprises a search engine adapted to locate, on the network, a profile of each party involved in the service instance, each profile including a listing of communication devices associated with the respective party, and a network address of each communication device.

5. An Enhanced Communication Services layer as claimed in claim 4, wherein the Contact Agent further comprises a filter adapted to filter each of the located profiles with respect to the communication goal of the originating party.

6. An Enhanced Communication Services layer as claimed in claim 2, wherein the Contact Agent is operative to generate a set of communication primitives defining, in respect of the service instance, a respective profile for each of the parties, and a set of one or more communication services required for the service instance.

7. An Enhanced Communication Services layer as claimed in claim 1, wherein the Exchange Agent is responsive to a set of communication primitives defining, in respect of the service instance, a respective profile for each of the parties, and a set of one or more communication services required for the service instance.

8. An Enhanced Communication Services layer as claimed in claim 7, wherein the Exchange Agent is operative to generate a set of network primitives defining, in respect of the service instance, addresses of required transport services layer devices, QoS and CoS requirements, and any adaptive services required for the service instance.

9. An Enhanced Communication Services layer as claimed in claim 1, wherein the Transport Agent is responsive to a set of network primitives defining, in respect of the service instance, addresses of required transport services layer devices, QoS and CoS requirements, and any adaptive services required for the service instance.

10. An Enhanced Communication Services layer as claimed in claim 9, wherein the Transport Agent is operative to generate a set of transport primitives defining, in respect of the service instance, end-to-end device and network services triggers for engaging the required transport services layer devices to effect end-to-end transport of the payload data.

11. An Enhanced Communication Services layer as claimed in claim 1, wherein the Contact Agent is resident on any one or more of an end-user communication appliance; a network access provider server; and a network server.

12. An Enhanced Communication Services layer as claimed in claim 1, wherein the Exchange Agent is resident on any one or more of a network access provider server; and a network server.

13. An Enhanced Communication Services layer as claimed in claim 1, wherein the Transport Agent is resident on a network server.

14. A method of providing Enhanced Communication Services in a communication network, the method comprising the steps of:
    a) discovering information identifying an originating party of a service instance and at least one receiving party of the service instance;
    b) selecting, from a network space comprising one or more transport services, a best match set of transport services for satisfying a communication goal of the originating party in respect of the service instance; and c) engaging the selected set of transport services for the duration of the service instance.

15. A method as claimed in claim 14, wherein the step of discovering information comprises the steps of:
   a) obtaining a respective profile for each of the parties;
   b) defining, on the basis of each respective profile, communication CoS and QoS requirements of the service instance; and
   c) determining a location on the network of each of the parties.

16. A method as claimed in claim 15, further comprising the step of generating a set of one of more communication primitives describing an identity and location of each of the parties, and communication CoS and QoS requirements of the service instance.

17. A method as claimed in claim 14, wherein the step of selecting a best match set of transport services comprises the steps of:
   a) selecting, on the basis of each respective party profile, end-point equipment best suited to the originating party's communication goal for the service instance;
   b) locating the network addresses of the selected end-point equipment; and
   c) selecting, from the network space, one or more network services intermediate the selected end-point equipment for transporting payload data of the service instance.

18. A method as claimed in claim 17, wherein the selection of intermediate network services is based on requirements and preferences defined in the respective profiles of the parties to the service instance.

19. A method as claimed in claim 17, further comprising evaluating operating characteristics and policies of the selected intermediate network services, and identifying any dissimilar protocols in the set of selected intermediate network services.

20. A method as claimed in claim 19, further comprising, where the selected intermediate network services include dissimilar protocols, securing one or more adaptation services to facilitate conversion of the payload data between the dissimilar protocols.

21. A method as claimed in claim 17, further comprising generating a set of one or more network primitives describing delay, throughput, reliability, and connectivity requirements of the service instance.

22. A method as claimed in claim 17, further comprising generating a Contract defining terms, conditions and services applicable to the service instance; wherein the terms define cost and payment information; the conditions define party and transport service policies governing the service instance; and the services comprise device addresses for each device involved in the service instance and device commands for controlling the devices with respect to the service instance.

23. A method as claimed in claim 14, wherein the step of engaging the selected set of transport services comprises the step of dynamically matching characteristics of respective transport media to QoS and CoS parameters of the service instance.

24. A communication network adapted for providing flexible communication services between end users, the network comprising:
   a) a Content Application Layer adapted for generating payload data of a service instance;
   b) a Transport Services Layer adapted for end-to-end transport of the payload data; and
   c) an Enhanced Communication Services layer intermediate the content application layer and the transport services layer, the Enhanced Communication Services layer comprising:
      i) a Contact Agent responsive to the Content Application Layer and adapted to discover information identifying an originating party and at least one receiving party of the service instance;
      ii) an Exchange Agent responsive to the Contact Agent and adapted to select, from a network space comprising one or more transport services, a best match set of transport services for satisfying a communication goal of the originating party in respect of the service instance; and
      iii) a Transport Agent responsive to the Exchange Agent for engaging the selected set of transport services for a duration of the service instance.

25. A communication network as claimed in claim 24, wherein the Content Application Layer comprises any one or more of: communication devices, device resources, application software; and other network edge-based content-generating services.

26. A communication network as claimed in claim 24, wherein the Transport Services Layer comprises two or more heterogeneous federated networks.

27. A communication network as claimed in claim 26, wherein each of the federated networks incorporates either new or legacy transport technologies.

28. A communication network as claimed in claim 24, wherein the Contact Agent is responsive to a set of primitives for identifying, in respect of the service instance, an originating party, one or more receiving parties; and a communication goal of the originating party.

29. A communication network as claimed in claim 28, wherein the Contact Agent is operative to generate a set of communication primitives defining, in respect of the service instance, profiles of each of the parties and communication services required for the service instance.

30. A communication network as claimed in claim 24, wherein the Exchange Agent is responsive to a set of communication primitives defining, in respect of the service instance, profiles of each of the parties and communication services required for the service instance.

31. A communication network as claimed in claim 30, wherein the Exchange Agent is operative to generate a set of network primitives defining, in respect of the service instance, addresses of involved transport layer devices, QoS and CoS requirements, and any adaptive services required for the service instance.

32. A communication network as claimed in claim 24, wherein the Transport Agent is responsive to a set of network primitives defining, in respect of the service instance, addresses of involved transport layer devices, QoS and CoS requirements, and any adaptive services required for the service instance.

33. A communication network as claimed in claim 32, wherein the Transport Agent is operative to generate a set of transport primitives defining, in respect of the service instance, end-to-end device and network services triggers for engaging the transport services layer of the communication network.

34. A communication network as claimed in claim 24, wherein the Contact Agent is resident on any one or more of an end-user communication appliance; a network access provider server; and a network server.

35. A communication network as claimed in claim 24, wherein the Exchange Agent is resident on any one or more of a network access provider server; and a network server.

36. A communication network as claimed in claim 24, wherein the Transport Agent is resident on a network server.

37. A Contact Agent operable in a communication network having a content application layer adapted to generate payload data of a service instance, the Contact Agent being responsive to the Content Application Layer and comprising:
   a) a profile construction portion adapted to construct a respective party profile for each party involved in the service instance; and
   b) an API generating portion adapted to generate one or more communication primitives defining, in respect of the service instance, any one or more of: each party profile constructed by the profile construction portion; and a communication service required for the service instance.

38. A Contact Agent as claimed in claim 37, wherein the profile construction portion is responsive to a set of primitives adapted to identify, in respect of the service instance, any one or more of: an originating party; a receiving party; and a communication goal of the originating party.

39. A Contact Agent as claimed in claim 38, wherein the profile construction portion further comprises a search engine adapted to locate on the network a party profile in respect of each party.

40. A Contact Agent as claimed in claim 39, further comprising a filter portion adapted to filter each party profile in light of the communication goal of the originating party.

41. A Contact Agent as claimed in claim 40, wherein the API generating portion is adapted to generate, in respect of the service instance, a respective communication primitive defining each filtered party profile.

42. An Exchange Agent operable in a communication network having a content application layer adapted to generate payload data of a service instance involving two or more parties, and a transport services layer comprising a physical fabric of the communication network and adapted for end-to-end transport of the payload data, the Exchange Agent being adapted to select, from a network space comprising one or more transport services, a best match set of transport services for the service instance, and comprising:
   a) a service management portion adapted to select a respective best match end-point device for each party involved in the service instance;
   b) a directory services portion adapted to resolve a physical address on the network corresponding to each selected end-point device; and
   c) a session control portion adapted to select, from the network space; a best match set of transport services for end-to-end connectivity between the selected end-point devices.

43. An Exchange Agent as claimed in claim 42, wherein the Exchange Agent is responsive to a set of communication primitives defining, in respect of the service instance, a respective profile for each of the parties, and a communication service required for the service instance.

44. An Exchange Agent as claimed in claim 43, wherein the service management portion selects the best match end-point device for each party on the basis of the respective profile for each of the parties, and a communication service required for the service instance.

45. An Exchange Agent as claimed in claim 43, wherein the service management portion is further adapted to determine whether or not content adaptation of the payload data is required for the service instance.

46. An Exchange Agent as claimed in claim 45, further comprising a transformation services portion adapted to select from the network space one or more content adaptation services when the service management portion determines that content adaptation of the payload data is required for the service instance.

47. An Exchange Agent as claimed in claim 42, further comprising a brokerage services portion adapted to negotiate, in respect of the service instance, network services to satisfy session requirements of the service instance.

48. An Exchange Agent as claimed in claim 42, wherein the Exchange Agent is adapted to generate a set of network primitives defining, in respect of the service instance, any one or more of: addresses of required transport services layer devices; QoS and CoS requirements; and any adaptive services required for the service instance.

49. A Transport Agent operable in a communication network having a content application layer adapted to generate payload data of a service instance, and a transport services layer comprising a physical fabric of the communication network and being adapted for end-to-end transport of the payload data across the communication network, the Transport Agent being adapted to engage, from the transport services layer, a best match set of transport media to accomplish end-to-end transport of the payload data of the service instance, and comprising:
   a) a directory services portion adapted to determine a best-match route for end-to end connectivity across the communication network; and
   b) a session control portion adapted to engage, in the transport services layer, transport services layer devices corresponding to the best-match route.

50. A Transport Agent as claimed in claim 49, wherein the Transport Agent is responsive to a set of network primitives defining, in respect of the service instance, any one or more of: addresses of required transport services layer devices; QoS and CoS requirements; and any adaptive services required for the service instance.

51. A Transport Agent as claimed in claim 49, wherein the Transport Agent is operative to generate a set of transport primitives defining, in respect of the service instance, end-to-end device and network services triggers for engaging transport services layer devices corresponding to the best-match route.

52. A Transport Agent as claimed in claim 49, further comprising a brokerage services portion adapted to negotiate, in respect of a service instance, transport services layer services satisfying QoS and QoS requirements of the service instance.

* * * * *